(12) United States Patent
Sugiura et al.

(10) Patent No.: US 9,293,779 B2
(45) Date of Patent: Mar. 22, 2016

(54) FUEL CELL

(71) Applicant: HONDA MOTOR CO., LTD., Minato-Ku, Tokyo (JP)

(72) Inventors: Seiji Sugiura, Utsunomiya (JP); Shuhei Goto, Utsunomiya (JP); Kenichi Murakami, Saitama (JP); Kentaro Ishida, Utsunomiya (JP); Keisuke Suda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 13/915,709

(22) Filed: Jun. 12, 2013

(65) Prior Publication Data

US 2013/0337359 A1  Dec. 19, 2013

(30) Foreign Application Priority Data

Jun. 18, 2012 (JP) .................................. 2012-136911
Apr. 22, 2013 (JP) .................................. 2013-089563

(51) Int. Cl.
| H01M 8/10 | (2006.01) |
| H01M 4/24 | (2006.01) |
| H01M 8/02 | (2006.01) |
| H01M 8/04 | (2006.01) |

(52) U.S. Cl.
CPC ............ *H01M 8/1006* (2013.01); *H01M 4/242* (2013.01); *H01M 8/0258* (2013.01); *H01M 8/04089* (2013.01); *H01M 8/10* (2013.01); *H01M 2008/1095* (2013.01); *Y02E 60/124* (2013.01); *Y02E 60/521* (2013.01)

(58) Field of Classification Search
CPC ..... H01M 8/1006; H01M 4/242; H01M 8/10; H01M 8/0258; Y02E 61/521; Y02E 60/124
USPC ................................. 429/457, 482
See application file for complete search history.

(56) References Cited

U.S. PATENT DOCUMENTS

| 8,110,316 | B2 | 2/2012 | Oda et al. | |
| 2005/0249995 | A1* | 11/2005 | Sugiura et al. | 429/34 |
| 2009/0042075 | A1* | 2/2009 | Nakanishi et al. | 429/26 |

FOREIGN PATENT DOCUMENTS

| CN | 101312250 A | 11/2008 |
| JP | 2008-293694 A | 12/2008 |

OTHER PUBLICATIONS

Office Action with search report dated Apr. 7, 2015 issued over the corresponding Chinese Patent Application No. 201310225251.5 with the English translation of pertinent portion.

* cited by examiner

*Primary Examiner* — Mark F Huff
*Assistant Examiner* — Monique Wills
(74) *Attorney, Agent, or Firm* — Carrier Blackman & Associates, P.C.; Joseph P. Carrier; Fulchand P. Shende

(57) ABSTRACT

A fuel cell includes a membrane electrode assembly, a first separator, and a second separator. The second separator has a fuel gas flow field connected to a fuel gas supply passage and a fuel gas discharge passage. The fuel gas flow field includes a plurality of corrugated flow grooves and a flat flow field. The corrugated flow grooves extend in the horizontal direction, respectively, and are arranged in the direction of the gravity. The flat flow field is provided within a power generation area, at the lowermost position in the direction of the gravity, and extends in the horizontal direction.

6 Claims, 29 Drawing Sheets

FIG. 1

FUEL CELL

CROSS-REFERENCE TO RELATED APPLICATIONS

This application is based upon and claims the benefit of priority from Japanese Patent Applications No. 2012-136911 filed on Jun. 18, 2012 and No. 2013-089563 filed on Apr. 22, 2013, the contents all of which are incorporated herein by reference.

BACKGROUND OF THE INVENTION

1. Field of the Invention

The present invention relates to a fuel cell formed by stacking a membrane electrode assembly and separators in a horizontal direction. The membrane electrode assembly includes a pair of electrodes and an electrolyte membrane interposed between the electrodes. A reactant gas flow field is provided for allowing a reactant gas to flow along an electrode surface in the horizontal direction.

2. Description of the Related Art

For example, a solid polymer electrolyte fuel cell employs a membrane electrode assembly (MEA) which includes an anode, a cathode, and a solid polymer electrolyte membrane (electrolyte) interposed between the anode and the cathode. The solid polymer electrolyte membrane is a polymer ion exchange membrane. The membrane electrode assembly is sandwiched between a pair of separators. Normally, a plurality of fuel cells are stacked together, and used in stationary applications. Further, the fuel cells are mounted in a fuel cell vehicle, and used as an in-vehicle fuel cell system.

In the fuel cell, metal separators each having a corrugated shape formed by press forming is used. A fuel gas flow field (hereinafter also referred to as the reactant gas flow field) for supplying a fuel gas to the anode and an oxygen-containing gas flow field (hereinafter also referred to as the reactant gas flow field) for supplying an oxygen-containing gas to the cathode are provided in surfaces of the metal separators. For each of power generation cells, or for every predetermined number of power generation cells, a coolant flow field is provided for supplying a coolant along surfaces of the metal separators.

In this regard, the coolant flow field has structure where a back surface of the fuel gas flow field and a back surface of the oxygen-containing gas flow field are stacked with each other. Thus, the fuel gas flow field and the oxygen-containing gas flow field are corrugated flow fields, and the coolant flow field is formed by stacking the back surfaces of the corrugated flow field in different phases (Japanese Laid-Open Patent Publication No. 2008-293694).

SUMMARY OF THE INVENTION

In some cases, the fuel cell is placed in a space having a limited height. For this purpose, for example, a laterally elongated fuel cell is adopted. In the fuel cell of this type, it is required to allow the fuel gas and the oxygen-containing gas to flow through the fuel gas flow field and the oxygen-containing gas flow field in a horizontal direction.

In this regard, since the corrugated flow fields of the fuel gas flow field and the oxygen-containing gas flow field extend in the stacking direction, recesses each including a lower curve or bent portion and an upper curve or bent portion are present. Therefore, in particular, the water tends to be retained as stagnant water in the recesses at lower positions in the direction of the gravity, and metal ions are dissolved from the separators. Therefore, the noble metal of the electrodes may be dissolved undesirably. Consequently, the dissolved ions are absorbed in the electrolyte membrane, and degradation of the electrolyte membrane occurs. Further, degradation of the electrode performance occurs.

A main object of the present invention is to provide a fuel cell in which though water produced in power generation reaction tends to be retained as stagnant water in a reactant gas flow field at lower positions in the direction of the gravity, the water can be discharged from the reactant gas flow field easily and reliably.

The present invention relates to a fuel cell formed by stacking a membrane electrode assembly and separators in a horizontal direction. The membrane electrode assembly includes a pair of electrodes and an electrolyte membrane interposed between the pair of electrodes. Each of the electrodes has an electrode surface standing vertically in a direction of gravity. A reactant gas flow field is provided for allowing an oxygen-containing gas or a fuel gas as a reactant gas to flow along the electrode surface in the horizontal direction.

In the fuel cell, the reactant gas flow field includes a plurality of corrugated flow grooves and a flat flow field. The corrugated flow grooves extend in a wavy pattern in a horizontal direction, and arranged in the direction of the gravity. The flat flow field is provided within a power generation area, at a lowermost position in the direction of the gravity. The flat flow field has a bottom extending straight in the horizontal direction.

In the present invention, when the reactant gas flows along the reactant gas flow field in the horizontal direction, water is produced in the power generation reaction, and the water tends to be retained as stagnant water at lower positions in the direction of the gravity. For this purpose, the flat flow field is provided at the lowermost position of the reactant gas flow field in the direction of the gravity. The bottom of the flat flow field extends straight in the horizontal direction.

Thus, water which has moved down to the lower side of the reactant gas flow field in the direction of the gravity flows smoothly along the bottom of the flat flow field. Then, the water is discharged from the reactant gas flow field, i.e., from the power generation area. Thus, though the water produced in the power generation reaction tends to be retained as stagnant water on the lower side of the reactant gas flow field in the direction of the gravity, with the simple structure, the water can be discharged from the reactant gas flow field easily and reliably.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is an exploded perspective view showing main components of a fuel cell according to a first embodiment of the present invention;

DESCRIPTION OF THE PREFERRED EMBODIMENTS

Figure 1:
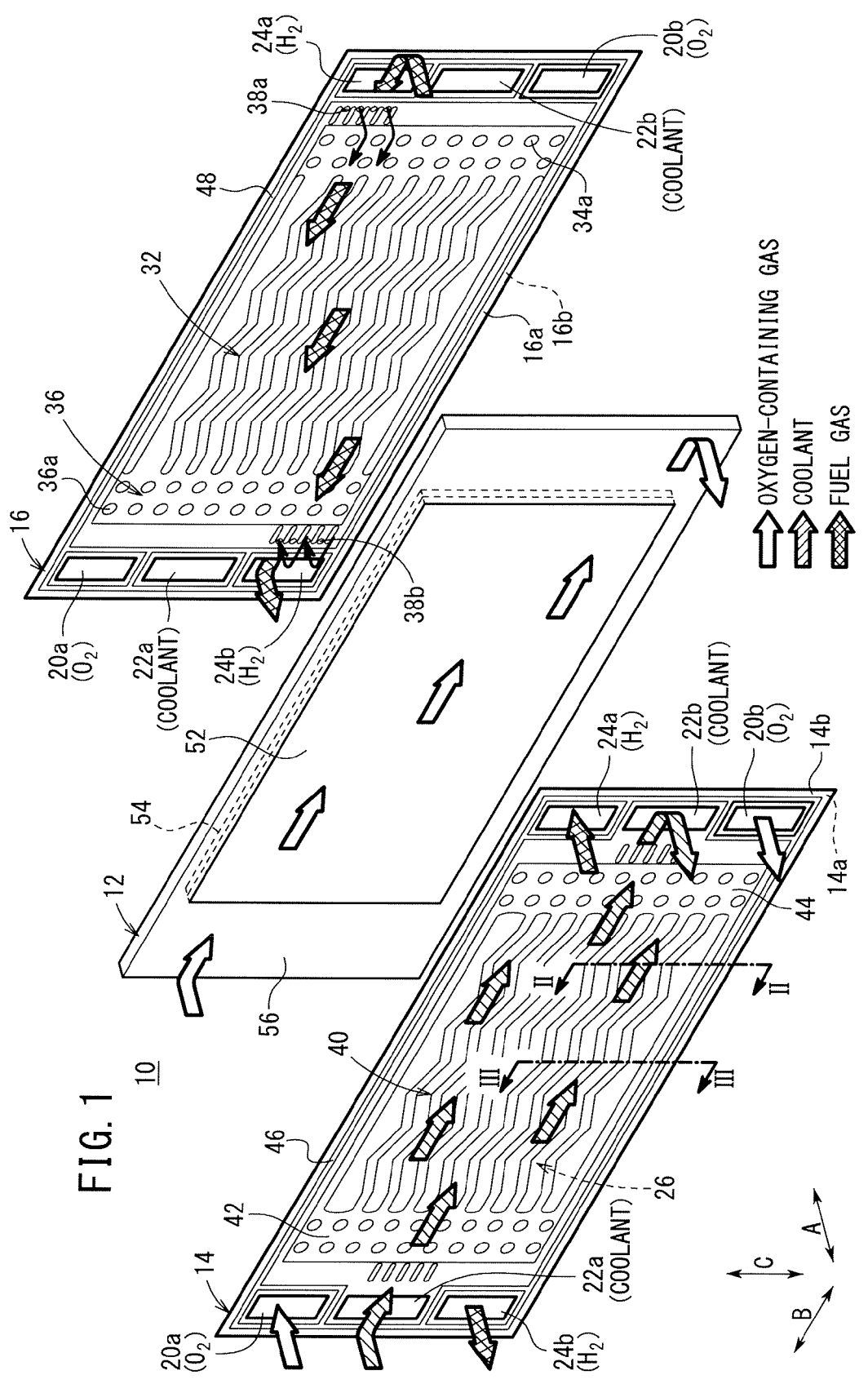
Figure 2:
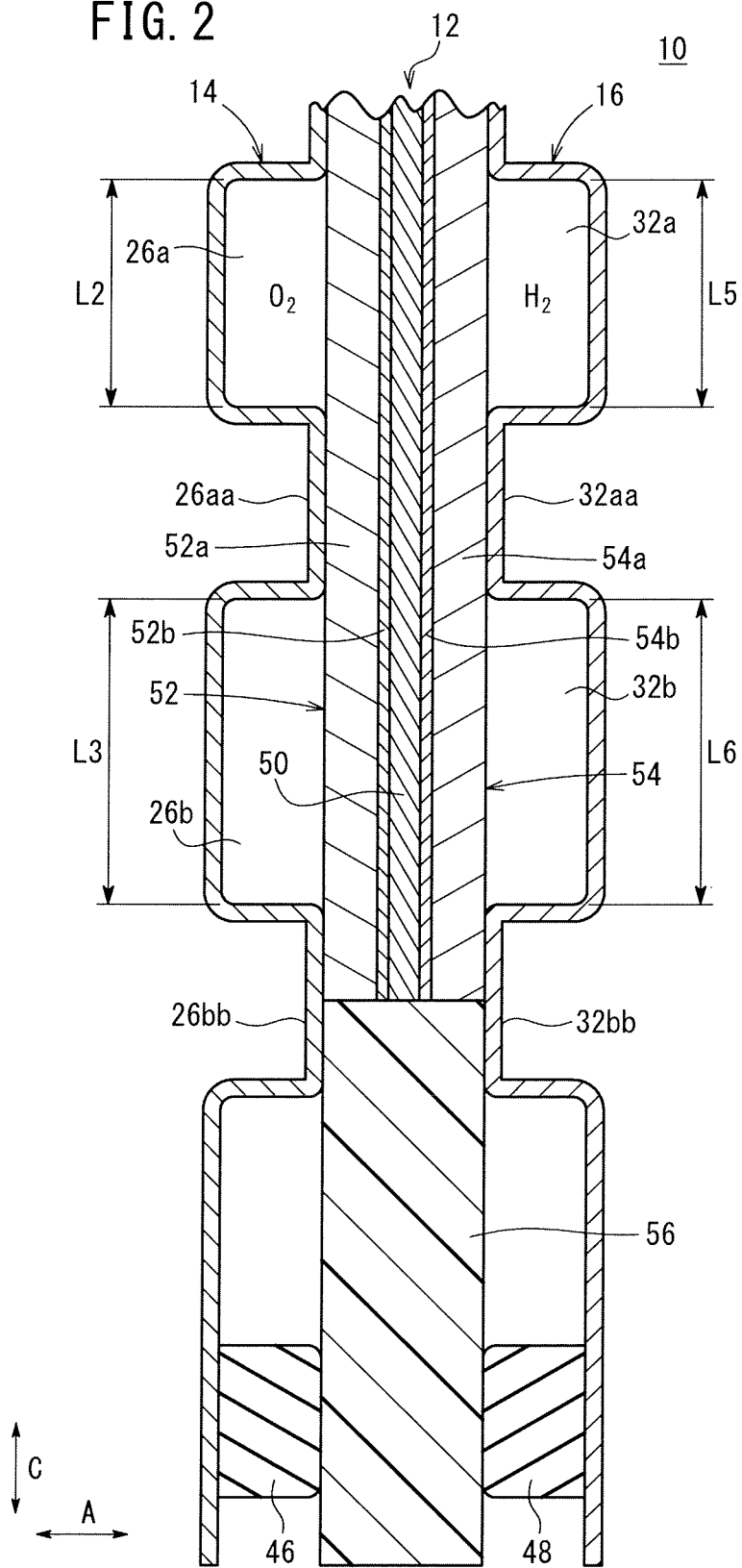
FIG. 2 is a cross sectional view showing the fuel cell, taken along a line II-II in FIG. 1.

A plurality of fuel cells 10 according to a first embodiment of the present invention shown in FIG. 1 are stacked together upright in a horizontal direction indicated by an arrow A to form a fuel cell stack, e.g., mounted in a vehicle.

The fuel cell 10 has a laterally elongated shape, and includes a membrane electrode assembly 12 and a first separator (cathode side separator) 14 and a second separator (anode side separator) 16 sandwiching the membrane electrode assembly 12. The first separator 14 and the second separator 16 are formed by corrugating metal thin plates by press forming to have corrugated shapes in cross section (see FIGS. 2 and 3).

For example, the first separator 14 and the second separator 16 are metal separators of steel plates, stainless steel plates, aluminum plates, plated steel sheets, or metal plates having anti-corrosive surfaces by surface treatment. Carbon separators may be used as the first separator 14 and the second separator 16.

At one end of the fuel cell 10 in a longitudinal direction indicated by an arrow B (horizontal direction in FIG. 1), an oxygen-containing gas supply passage 20a for supplying an oxygen-containing gas (reactant gas), a coolant supply passage 22a for supplying a coolant, and a fuel gas discharge passage 24b for discharging a fuel gas (reactant gas) such as a hydrogen containing gas are arranged in a vertical direction indicated by an arrow C. The oxygen-containing gas supply passage 20a, the coolant supply passage 22a, and the fuel gas discharge passage 24b extend through the fuel cell 10 in the stacking direction indicated by the arrow A.

At the other end of the fuel cell 10 in the direction indicated by the arrow B, a fuel gas supply passage 24a for supplying the fuel gas, a coolant discharge passage 22b for discharging the coolant, and an oxygen-containing gas discharge passage 20b for discharging the oxygen-containing gas are arranged in a direction indicated by an arrow C. The fuel gas supply passage 24a, the coolant discharge passage 22b, and the oxygen-containing gas discharge passage 20b extend through the fuel cell 10 in the direction indicated by the arrow A.

Figure 4:
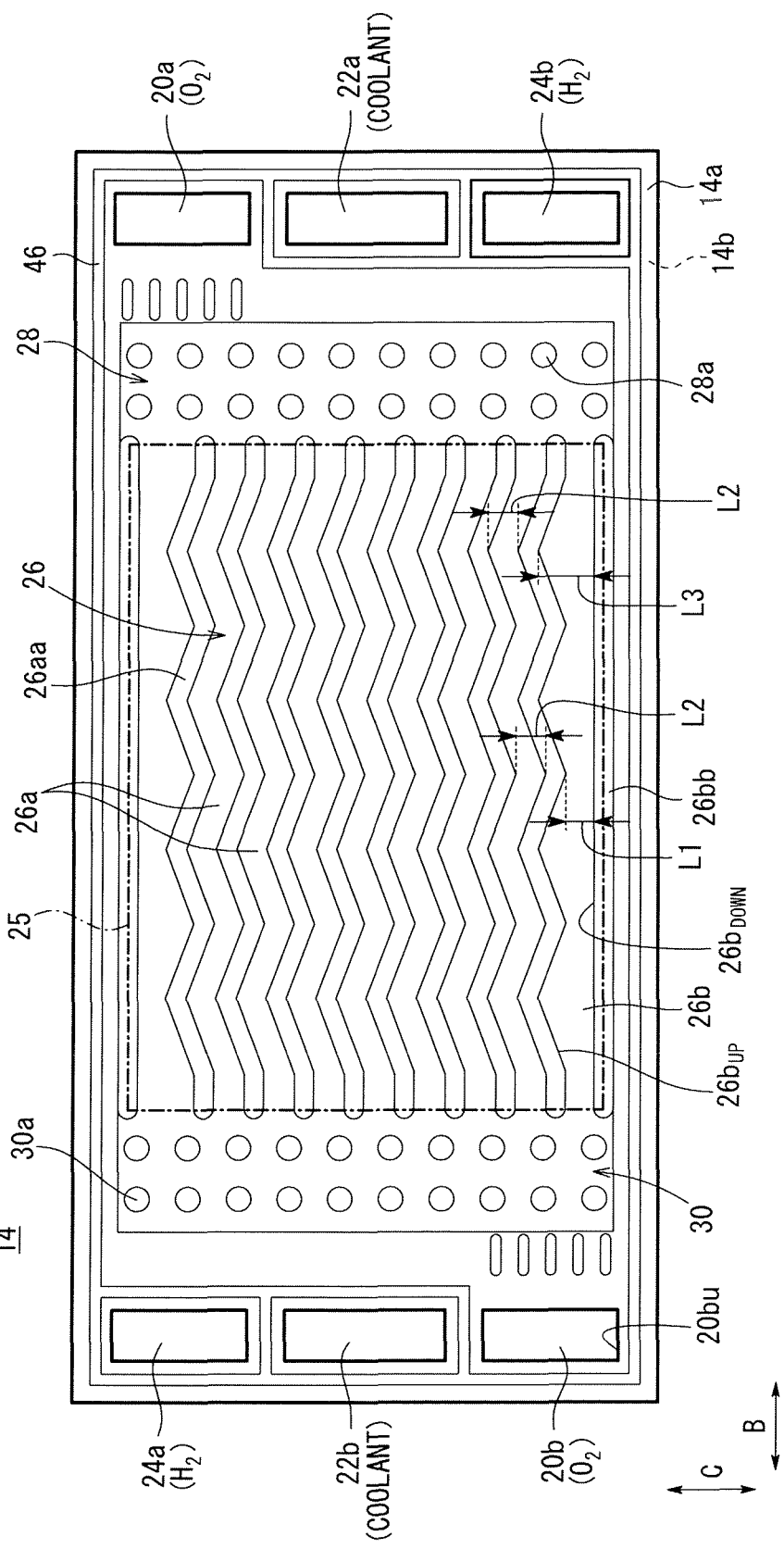
FIG. 4 is a front view showing a first separator of the fuel cell.

As shown in FIG. 4, the first separator 14 has an oxygen-containing gas flow field (reactant gas flow field) 26 on its surface 14a facing the membrane electrode assembly 12. The oxygen-containing gas flow field 26 is connected to the oxygen-containing gas supply passage 20a and the oxygen-containing gas discharge passage 20b. The oxygen-containing gas flow field 26 includes a plurality of corrugated flow grooves 26a and a flat flow field 26b. The corrugated flow grooves 26a are arranged in the direction of gravity and extend in a wavy pattern in a horizontal direction. The flat flow field 26b is provided within a power generation area 25, at the lowermost position in the direction of the gravity. A bottom $26b_{DOWN}$ of the flat flow field 26b extends straight in the horizontal direction. The flat flow field 26b is provided above a bottom 20bu of the oxygen-containing gas discharge passage 20b. For example, the flat flow field 26b may be inclined downward toward the oxygen-containing gas discharge passage 20b.

The corrugated flow grooves 26a are formed between corrugated ridges 26aa protruding from the surface 14a, and the flat flow field 26b is formed between a flat ridge 26bb protruding from the surface 14a and the adjacent corrugated ridge 26aa at the lowermost position. A ceiling $26b_{UP}$ of the flat flow field 26b has a vertically zigzag or wavy pattern. The cross sectional area of the flat flow field 26b is larger than the cross sectional area of each of the corrugated flow grooves 26a.

Figure 3:
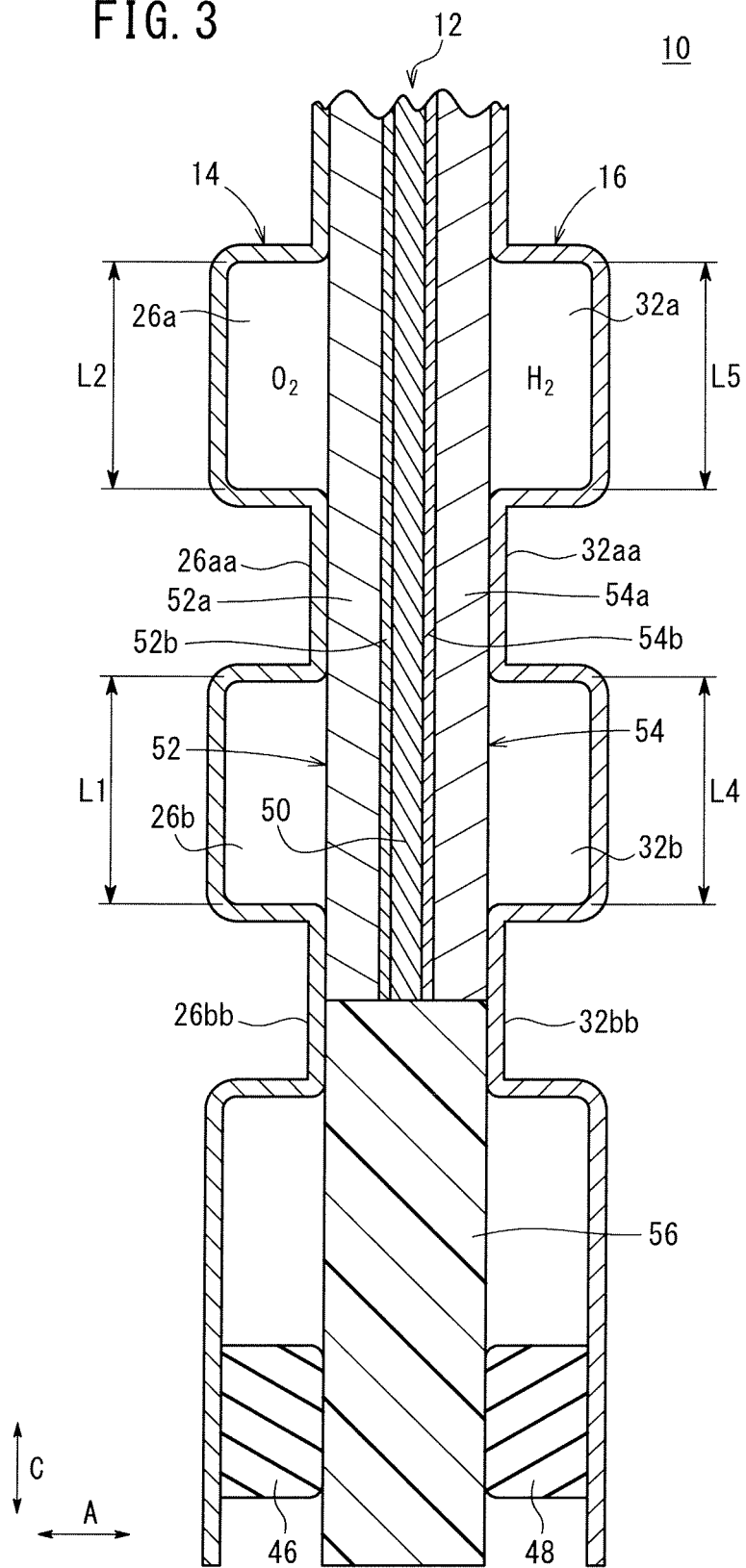
FIG. 3 is a cross sectional view showing the fuel cell, taken along a line III-III in FIG. 1.

As shown in FIGS. 3 and 4, at the position where a flow field width L1 of the flat flow field 26b is the minimum, the flow field width L1 is equal to the flow field width L2 of each of the corrugated flow grooves 26a (L1=L2). The flow field width L2 of the corrugated flow groove 26a is constant in the horizontal direction. As shown in FIG. 2, at the position where the flow field width L3 of the flat flow field 26b is the maximum, the flow field width L3 is larger than the flow field width L2 of each of the corrugated flow grooves 26a (L2<L3).

As shown in FIG. 4, an inlet buffer 28 having a plurality of bosses 28a is provided at the inlet of the oxygen-containing gas flow field 26, and an outlet buffer 30 having a plurality of bosses 30a is provided at the outlet of the oxygen-containing gas flow field 26.

Figure 5:
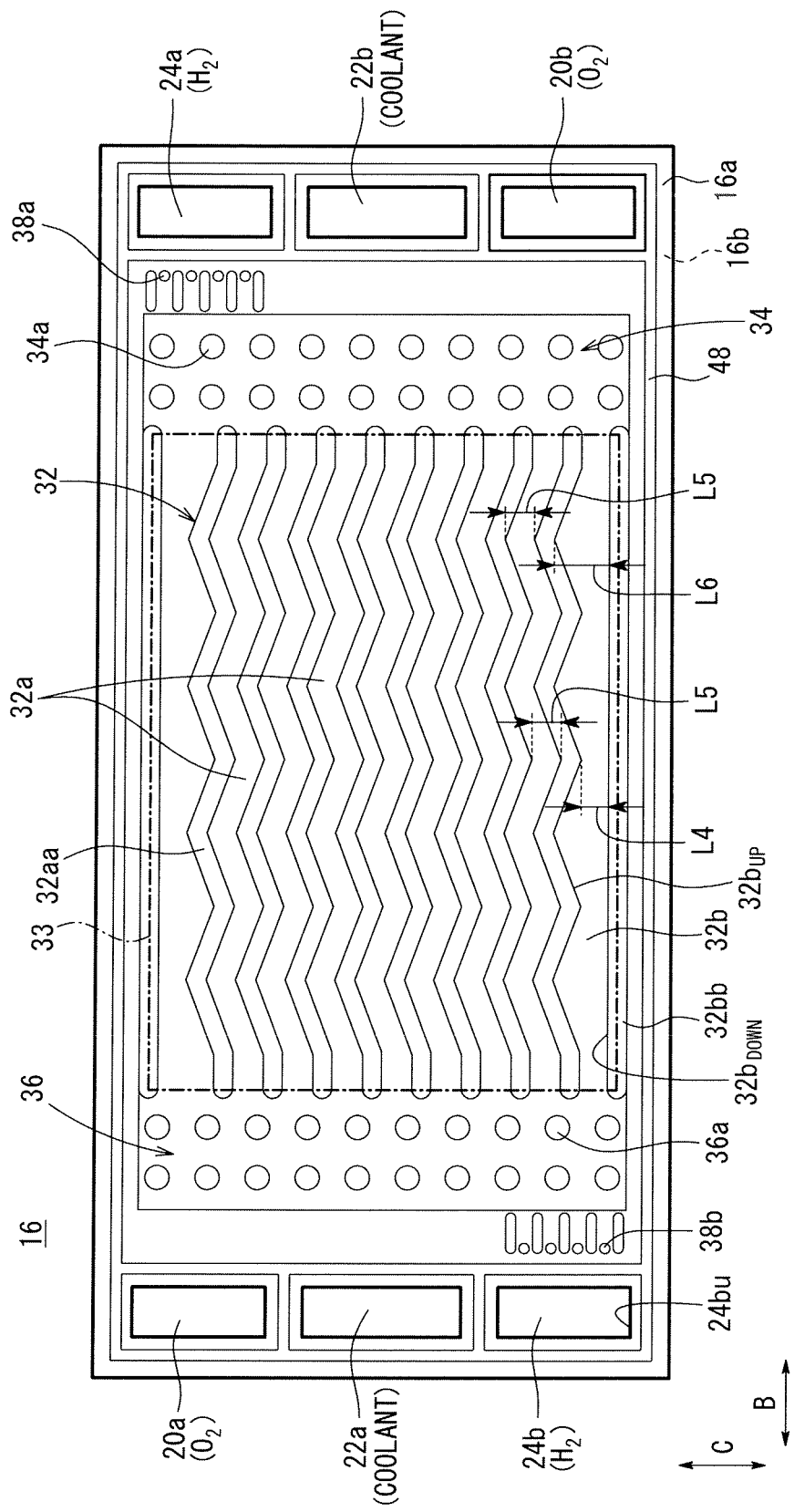
FIG. 5 is a front view showing a second separator of the fuel cell.

As shown in FIG. 5, the second separator 16 has a fuel gas flow field (reactant gas flow field) 32 on its surface 16a facing the membrane electrode assembly 12. The fuel gas flow field (reactant gas flow field) 32 is connected to the fuel gas supply passage 24a and the fuel gas discharge passage 24b. The fuel gas flow field 32 includes a plurality of corrugated flow grooves 32a and a flat flow field 32b. The corrugated flow grooves 32a are arranged in the direction of gravity and extend in a wavy pattern in the horizontal direction. The flat flow field 32b is provided within a power generation area 33, at the lowermost position in the direction of the gravity. A bottom $32b_{DOWN}$ of the flat flow field 32b extends straight in the horizontal direction. The flat flow field 32b is provided above a bottom 24bu of the fuel gas discharge passage 24b.

The corrugated flow grooves 32a are formed between corrugated ridges 32aa protruding from the surface 16a, and the flat flow field 32b is formed between a flat ridge 32bb protruding from the surface 16a and the adjacent corrugated ridge 32aa at the lowermost position. A ceiling $32b_{UP}$ of the flat flow field 32b has a vertically zigzag or wavy pattern. The cross sectional area of the flat flow field 32b is larger than the cross sectional area of each of the corrugated flow grooves 32a.

As shown in FIGS. 3 and 5, in the area where the flow field width L4 of the flat flow field 32b is the minimum, the flow field width L4 is equal to the flow field width L5 of each of the corrugated flow grooves 32a (L4=L5). The flow field width L5 of the corrugated flow groove 32a is constant in the horizontal direction. As shown in FIGS. 2 and 5, at the position where the flow field width L6 of the flat flow field 32b is the maximum, the flow field width L6 is larger than the flow field width L5 of each of the corrugated flow grooves 32a (L5<L6).

An inlet buffer 34 having a plurality of bosses 34a is provided at the inlet of the fuel gas flow field 32, and an outlet buffer 36 having a plurality of bosses 36a is provided at the outlet of the fuel gas flow field 32. A plurality of supply holes 38a are formed between the fuel gas supply passage 24a and the inlet buffer 34. A plurality of discharge holes 38b are formed between the fuel gas discharge passage 24b and the outlet buffer 36.

As shown in FIG. 1, a coolant flow field 40 is provided between a surface 14b of the first separator 14 and a surface 16b of the second separator 16. The coolant flow field 40 is formed by stacking the back surface of the oxygen-containing gas flow field 26 and the back surface of the fuel gas flow field 32 with each other. The coolant flow field 40 is connected to the coolant supply passage 22a through an inlet buffer 42, and connected to the coolant discharge passage 22b through an outlet buffer 44.

A first seal member 46 is formed integrally on the surfaces 14a, 14b of the first separator 14, around the outer end of the first separator 14. A second seal member 48 is formed integrally on the surfaces 16a, 16b of the second separator 16, around the outer end of the second separator 16.

In use, each of the first seal member 46 and the second seal member 48 is a resilient seal member made of seal material, cushion material, or packing material such as an EPDM (ethylene propylene diene monomer) rubber, an NBR (nitrile butadiene rubber), a fluoro rubber, a silicone rubber, a fluorosilicone rubber, a Butyl rubber, a natural rubber, a styrene rubber, a chloroprene rubber, or an acrylic rubber.

As shown in FIGS. 2 and 3, the membrane electrode assembly 12 includes a cathode 52, an anode 54, and a solid polymer electrolyte membrane 50 interposed between the cathode 52 and the anode 54. For example, the solid polymer electrolyte membrane 50 is formed by impregnating a thin membrane of perfluorosulfonic acid with water, for example. A fluorine based electrolyte membrane may be used as the solid polymer electrolyte membrane 50. Alternatively, an HC (hydrocarbon) based electrolyte membrane may be used as the solid polymer electrolyte membrane 50.

Each of the cathode 52 and the anode 54 has a gas diffusion layer 52a, 54a such as a carbon paper, and an electrode catalyst layer 52b, 54b. The electrode catalyst layers 52b, 54b are formed such that platinum alloy is supported on porous carbon particles, and the electrode catalyst layers 52b, 54b are deposited uniformly on the surface of the gas diffusion layer 52a, 54a. The electrode catalyst layer 52b of the cathode 52 and the electrode catalyst layer 54b of the anode 54 are fixed to both surfaces of the solid polymer electrolyte membrane 50, respectively.

The membrane electrode assembly 12 includes a resin frame member 56 formed around the solid polymer electrolyte membrane 50, the cathode 52, and the anode 54. For example, the resin frame member 56 is made of PPS (poly phenylene sulfide), PPA (polyphthalamide), PEN (polyethylene naphthalate), PES (polyethersulfone), LCP (liquid crystal polymer), PVDF (polyvinylidene fluoride), a silicone rubber, a fluoro rubber, or an EPDM (ethylene propylene diene monomer) rubber.

Operation of the fuel cell 10 will be described below.

Firstly, as shown in FIG. 1, in the fuel cell 10, an oxygen-containing gas is supplied to the oxygen-containing gas supply passage 20a, and a fuel gas such as a hydrogen-containing gas is supplied to the fuel gas supply passage 24a. Further, a coolant such as pure water or ethylene glycol is supplied to the coolant supply passages 22a. In the structure, in the fuel cell 10, the oxygen-containing gas, the fuel gas, and the coolant are supplied in the direction indicated by the arrow A.

As shown in FIG. 4, the oxygen-containing gas flows from the oxygen-containing gas supply passage 20a into the oxygen-containing gas flow field 26 of the first separator 14. The oxygen-containing gas flows along each of the corrugated flow grooves 26a of the oxygen-containing gas flow field 26 in the direction indicated by the arrow B. The oxygen-containing gas moves along the cathode 52 of the membrane electrode assembly 12 for inducing an electrochemical reaction at the cathode 52.

In the meanwhile, in the fuel gas, as shown in FIGS. 1 and 5, the fuel gas flows from the fuel gas supply passage 24a through the supply holes 38a into the fuel gas flow field 32 of the second separator 16. The fuel gas flows along each of the corrugated flow grooves 32a of the fuel gas flow field 32 in the direction indicated by the arrow B. The fuel gas moves along the anode 54 of the membrane electrode assembly 12 for inducing an electrochemical reaction at the anode 54.

Thus, in each of the membrane electrode assemblies 12, the oxygen-containing gas supplied to the cathode 52 and the fuel gas supplied to the anode 54 are partially consumed in the electrochemical reactions at electrode catalyst layers 52b, 54b of the cathode 52 and the anode 54 for generating electricity.

The oxygen-containing gas partially consumed at the cathode 52 is discharged into the oxygen-containing gas discharge passage 20b, and flows in the direction indicated by the arrow A. Likewise, the fuel gas partially consumed at the anode 54 is discharged from the discharge holes 38b into the fuel gas discharge passage 24b, and flows in the direction indicated by the arrow A.

The coolant flows from the coolant supply passage 22a into the coolant flow field 40 between the first separator 14 and the second separator 16, and flows in the direction indicated by the arrow B. After the coolant cools the membrane electrode assembly 12, the coolant moves through the coolant discharge passage 22b, and the coolant is discharged from the fuel cell 10.

In the first embodiment, as shown in FIG. 4, the oxygen-containing gas flow field 26 is provided on the surface 14a of the first separator 14. Further, the oxygen-containing gas flow field 26 includes the plurality of corrugated flow grooves 26a and the flat flow field 26b. The corrugated flow grooves 26a extend in a wavy pattern in the horizontal direction. The flat flow field 26b is provided within the power generation area 25, at the lowermost position in the direction of the gravity. The bottom $26b_{DOWN}$ of the flat flow field 26b extends straight in the horizontal direction.

In the structure, when the oxygen-containing gas flows along each of the corrugated flow grooves 26a of the oxygen-containing gas flow field 26 in the horizontal direction, water is produced by reaction. This water moves down to the lower side of the oxygen-containing gas flow field 26 in the direction of the gravity through the carbon paper or the like. Therefore, on the lower side of the oxygen-containing gas flow field 26, the quantity of heat radiated to the outside becomes large, and the temperature is lowered. Consequently, the amount of the condensed water is increased.

The flat flow field 26b is provided at the lowermost position of the oxygen-containing gas flow field 26 in the direction of the gravity. Thus, the water which has moved down to the lower side in the direction of the gravity from each of the corrugated flow grooves 26a through the carbon paper or the like and the condensed water on the lower side of the oxygen-containing gas flow field 26 move smoothly along the bottom $26b_{DOWN}$ of the flat flow field 26b. Then, the water is discharged from the oxygen-containing gas flow field 26, i.e., from the power generation area 25.

Thus, though the water produced in the power generation reaction tends to be retained as stagnant water on the lower side of the oxygen-containing gas flow field 26 in the direction of the gravity, with the simple structure, the water can be discharged from the oxygen-containing gas flow field 26 easily and reliably. Therefore, the solid polymer electrolyte membrane 50 does not absorb the dissolved ions. Accordingly, degradation of the solid polymer electrolyte membrane 50 is suppressed reliably, and it is possible to prevent degradation of the electrode performance reliably.

Further, the cross sectional area of the flat flow field 26b is larger than the cross sectional area of the corrugated flow grooves 26a. Thus, it becomes possible to suitably suppress stagnation of the water due to the surface tension, and the water can be discharged effectively.

As shown in FIG. 5, the fuel gas flow field 32 is provided on the surface 16a of the second separator 16. The fuel gas flow field 32 includes the plurality of corrugated flow grooves 32a and the flat flow field 32b. The corrugated flow grooves 32a extend in a wavy pattern in the horizontal direction. The flat flow field 32b is provided within the power generation area 33, at the lowermost position in the direction of the gravity. The bottom $32b_{DOWN}$ of the flat flow field 32b extends straight in the horizontal direction.

In the structure, when the fuel gas moves along each of the corrugated flow grooves 32a of the fuel gas flow field 32 in the horizontal direction, the water produced in the power generation reaction is diffused backward from the oxygen-containing gas flow field 26. This water moves down to the lower side of the fuel gas flow field 32 in the direction of the gravity, and the flat flow field 32b is provided at the lowermost position of the fuel gas flow field 32 in the direction of the gravity.

Therefore, the water which has moved downward from each of the corrugated flow grooves 32a in the direction of the gravity smoothly flows along the bottom $32b_{DOWN}$ of the flat flow field 32b, and the water is discharged from the fuel gas flow field 32, i.e., from the power generation area 33. Thus, though the water produced in the power generation reaction tends to be retained as stagnant water on the lower side of the fuel gas flow field 32 in the direction of the gravity, with simple structure, the water can be discharged from the fuel gas flow field 32 easily and reliably. Therefore, the solid polymer electrolyte membrane 50 does not absorb the dissolved ions. Accordingly, degradation of the solid polymer electrolyte membrane 50 is suppressed reliably, and it is possible to prevent degradation of the electrode performance reliably.

Further, the cross sectional area of the flat flow field 32b is larger than the cross sectional area of the corrugated flow grooves 32a. Thus, it becomes possible to suitably suppress stagnation of the water due to the surface tension, and the water can be discharged effectively.

Figure 6:
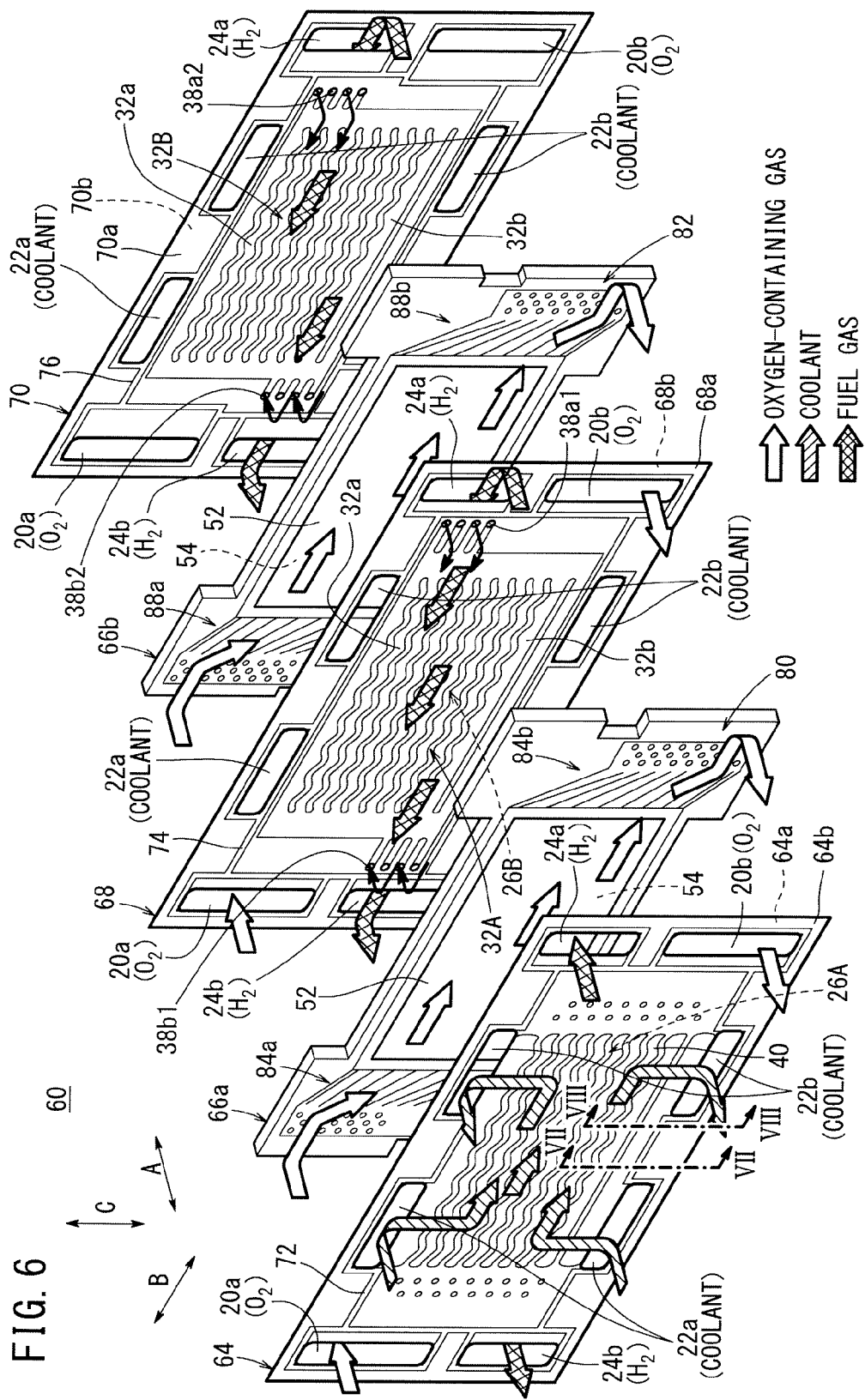
FIG. 6 is an exploded perspective view showing main components of a fuel cell according to a second embodiment of the present invention.
Figure 7:
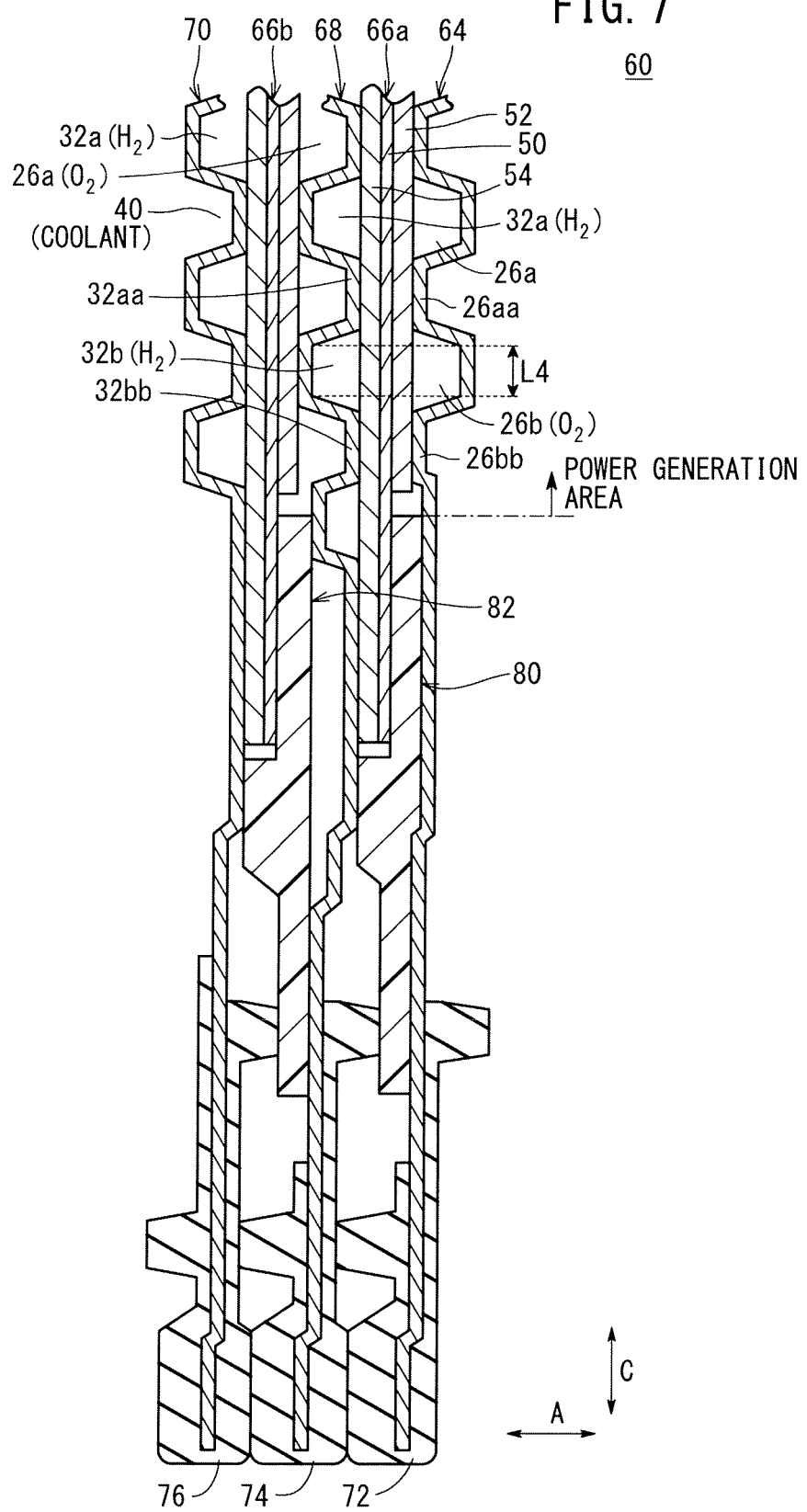
FIG. 7 is a cross sectional view showing the fuel cell, taken along a line VII-VII in FIG. 6.
Figure 8:
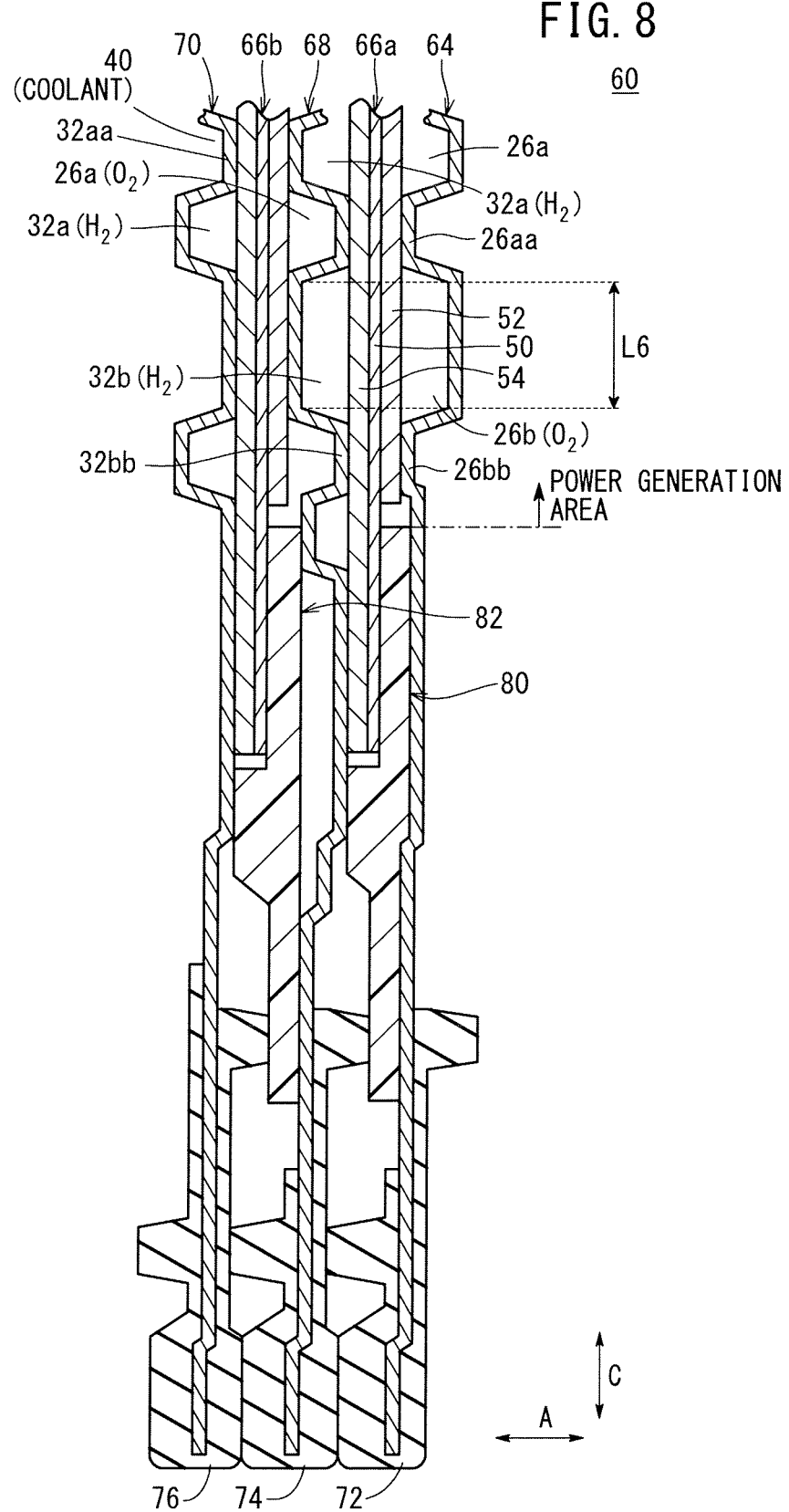
FIG. 8 is a cross sectional view showing the fuel cell, taken along a line VIII-VIII in FIG. 6.

A plurality of fuel cells 60 according to a second embodiment of the present invention shown in FIGS. 6 to 8 are stacked together in a horizontal direction indicated by an arrow A to form a fuel cell stack, e.g., mounted in a vehicle. The constituent elements that are identical to those of the fuel cell 10 according to the first embodiment are labeled with the same reference numerals, and detailed descriptions thereof will be omitted. Further, in third and other embodiments, the constituent elements that are identical to those of the fuel cell 10 according to the first embodiment are labeled with the same reference numerals, and detailed descriptions thereof will be omitted.

The fuel cell 60 includes a first separator 64, a first membrane electrode assembly 66a, a second separator 68, a second membrane electrode assembly 66b, and a third separator 70. The first separator 64, the first membrane electrode assembly 66a, the second separator 68, the second membrane electrode assembly 66b, and the third separator 70 are stacked together in a horizontal direction, and has a laterally elongated shape in the horizontal direction where electrode surfaces stand vertically in the direction of the gravity.

For example, the first separator 64, the second separator 68, and the third separator 70 are laterally elongated metal plates such as steel plates, stainless steel plates, aluminum plates, plated steel sheets, or metal plates having anti-corrosive surfaces by surface treatment. The first separator 64, the second separator 68, and the third separator 70 have a rectangular shape in a plan view, and are formed by corrugating metal thin plates by press forming to have corrugated shapes in cross section.

As shown in FIG. 6, at one end of the fuel cell 60 in a longitudinal direction indicated by an arrow B, an oxygen-containing gas supply passage 20a and a fuel gas discharge passage 24b are provided. The oxygen-containing gas supply passage 20a and the fuel gas discharge passage 24b extend through the fuel cell 60 in the direction indicated by the arrow A. At the other end of the fuel cell 60 in the longitudinal direction indicated by the arrow B, a fuel gas supply passage 24a and an oxygen-containing gas discharge passage 20b are provided. The fuel gas supply passage 24a and the oxygen-containing gas discharge passage 20b extend through the fuel cell 60 in the direction indicated by the arrow A.

At both ends of the fuel cell 60 in a lateral direction indicated by an arrow C, a pair of coolant supply passages 22a are provided on one side adjacent to the oxygen-containing gas supply passage 20a. The coolant supply passages 22a extend through the fuel cell 60 in the direction indicated by the arrow A. At both ends of the fuel cell 60 in the lateral direction, a pair of coolant discharge passages 22b are provided on the other side adjacent to the fuel gas supply passages 24a.

Figure 9:
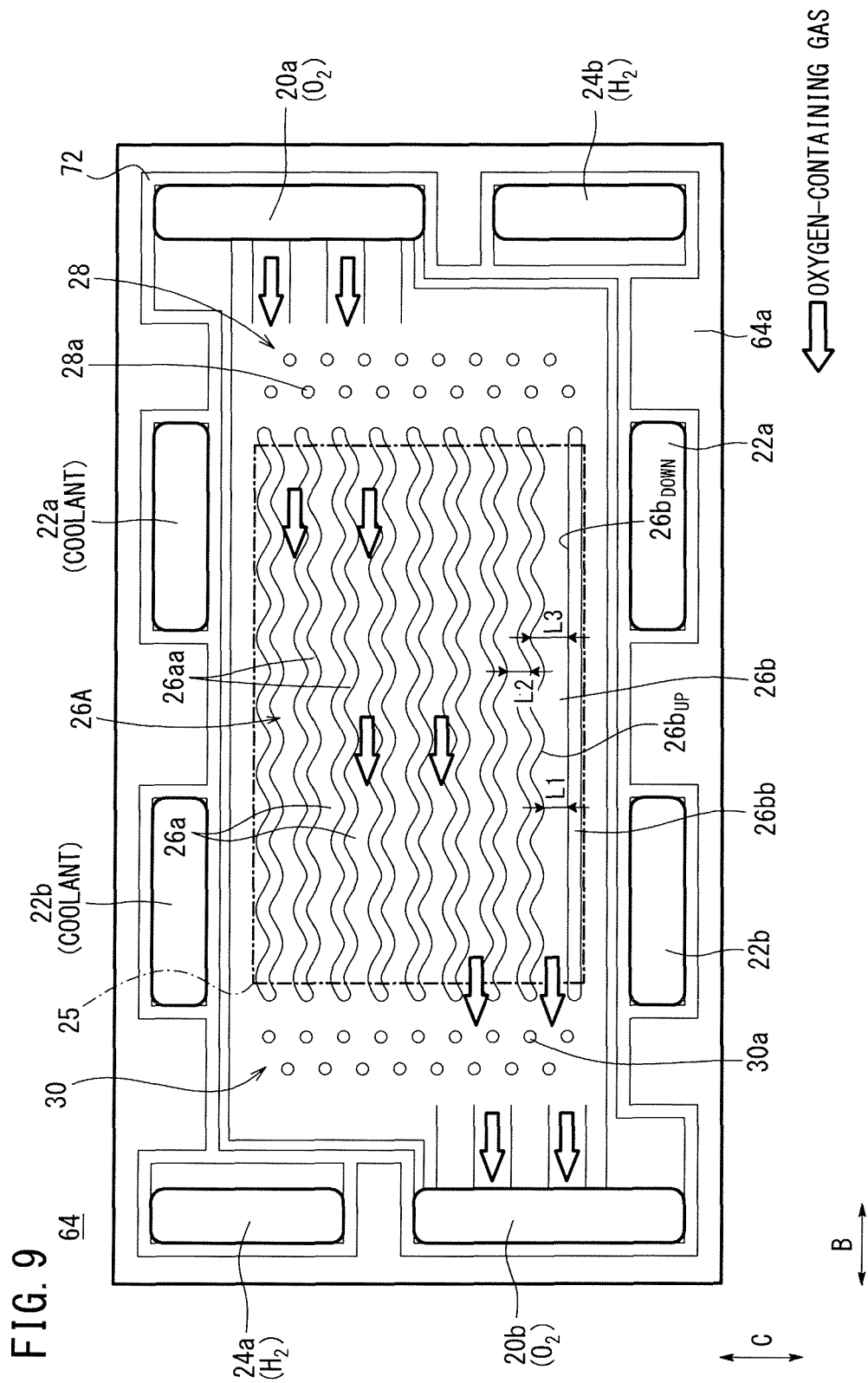
FIG. 9 is a front view showing a first separator of the fuel cell.

As shown in FIG. 9, the first separator 64 has a first oxygen-containing gas flow field 26A on its surface 64a facing the first membrane electrode assembly 66a. The first oxygen-containing gas flow field 26A is connected to the oxygen-containing gas supply passage 20a and the oxygen-containing gas discharge passage 20b.

As shown in FIG. 6, a coolant flow field 40 is formed on a surface 64b of the first separator 64. The coolant flow field 40 is connected to the coolant supply passage 22a and the coolant discharge passage 22b. The coolant flow field 40 is formed by stacking the back surface of the first oxygen-containing gas flow field 26A and the back surface of a second fuel gas flow field 32B with each other.

Figure 10:
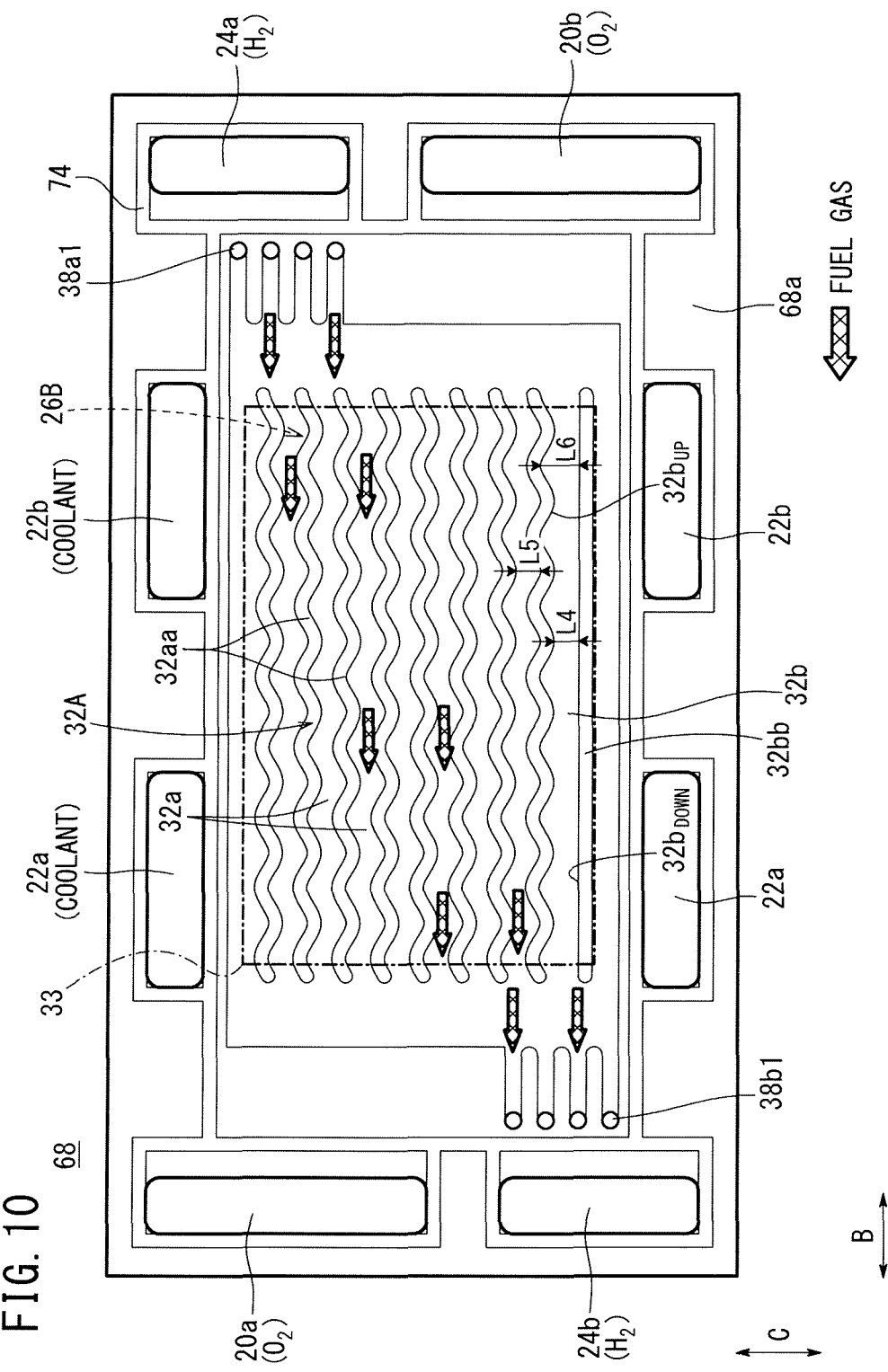
FIG. 10 is a front view showing a second separator of the fuel cell.

As shown in FIG. 10, the second separator 68 has a first fuel gas flow field 32A on its surface 68a facing the first membrane electrode assembly 66a. The first fuel gas flow field 32A is connected to the fuel gas supply passage 24a and the fuel gas discharge passage 24b. A plurality of supply holes 38a1 are formed adjacent to the fuel gas supply passage 24a, and a plurality of discharge holes 38b1 are formed adjacent to the fuel gas discharge passages 24b.

The second separator 68 has a second oxygen-containing gas flow field 26B on its surface 68b facing the second membrane electrode assembly 66b. The second oxygen-containing gas flow field 26B is connected to the oxygen-containing gas supply passage 20a and the oxygen-containing gas discharge passage 20b.

As shown in FIG. 6, the third separator 70 has the second fuel gas flow field 32B on its surface 70a facing the second membrane electrode assembly 66b. The second fuel gas flow field 32B is connected to the fuel gas supply passage 24a and the fuel gas discharge passage 24b. A plurality of supply holes 38a2 are formed adjacent to the fuel gas supply passage 24a, and a plurality of discharge holes 38b2 are formed adjacent to the fuel gas discharge passage 24b.

The supply holes 38a2 are positioned on the inner side in comparison with the supply holes 38a1 of the second separator 68 (fuel gas flow field side) and the discharge holes 38b2 are positioned on the inner side in comparison with the discharge holes 38b1 of the second separator 68 (fuel gas flow field side).

The coolant flow field 40 is partially formed on a surface 70b of the third separator 70, i.e., on the back surface of the second fuel gas flow field 32B. The coolant flow field 40 is formed by stacking the surface 64b of the first separator 64 adjacent to the third separator 70 on the surface 70b of the third separator 70.

A first seal member 72 is formed integrally on the surfaces 64a, 64b of the first separator 64, around the outer end of the first separator 64. A second seal member 74 is formed integrally on the surfaces 68a, 68b of the second separator 68, around the outer end of the second separator 68. A third seal member 76 is formed integrally on the surfaces 70a, 70b of the third separator 70, around the outer end of the third separator 70. The first seal member 72, the second seal member 74, and the third seal member 76 have the same structure as the first seal member 46 and the second seal member 48 described above.

As shown in FIGS. 7 and 8, each of the first membrane electrode assembly 66a and the second membrane electrode assembly 66b includes a cathode 52, an anode 54, and a solid polymer electrolyte membrane 50 interposed between the cathode 52 and the anode 54. The solid polymer electrolyte membrane 50 is formed by impregnating a thin membrane of perfluorosulfonic acid with water, for example. In each of the first membrane electrode assembly 66a and the second membrane electrode assembly 66b, the surface size (surface area) of the cathode 52 is smaller than the surface sizes of the anode 54 and the solid polymer electrolyte membrane 50, as a stepped-type MEA.

The cathode 52, the anode 54, and the solid polymer electrolyte membrane 50 may have the same surface area. The surface size of the anode 54 may be smaller than the surface sizes of the cathode 52 and the solid polymer electrolyte membrane 50.

In the first membrane electrode assembly 66a, a first resin frame member 80 is formed integrally with the outer periphery of the solid polymer electrolyte membrane 50, around the outer end of the cathode 52, e.g., by injection molding. In the second membrane electrode assembly 66b, a second resin frame member 82 is formed integrally with the outer periphery of the solid polymer electrolyte membrane 50, around the outer end of the cathode 52, e.g., by injection molding. As the resin material of the first resin frame member 80 and the second resin frame member 82, general purpose plastic may be adopted. Alternatively, for example, engineering plastic, super engineering plastic or the like may be adopted.

An inlet buffer 84a and an outlet buffer 84b are provided on a surface of the first resin frame member 80 where the cathode 52 is provided. The inlet buffer 84a is positioned between the oxygen-containing gas supply passage 20a and the inlet of the first oxygen-containing gas flow field 26A, and an outlet buffer 84b is positioned between the oxygen-containing gas discharge passage 20b and the outlet of the first oxygen-containing gas flow field 26A. Each of the inlet buffer 84a and the outlet buffer 84b has a plurality of bosses and a plurality of guide grooves. Buffers as described later have the same structure.

Figure 11:
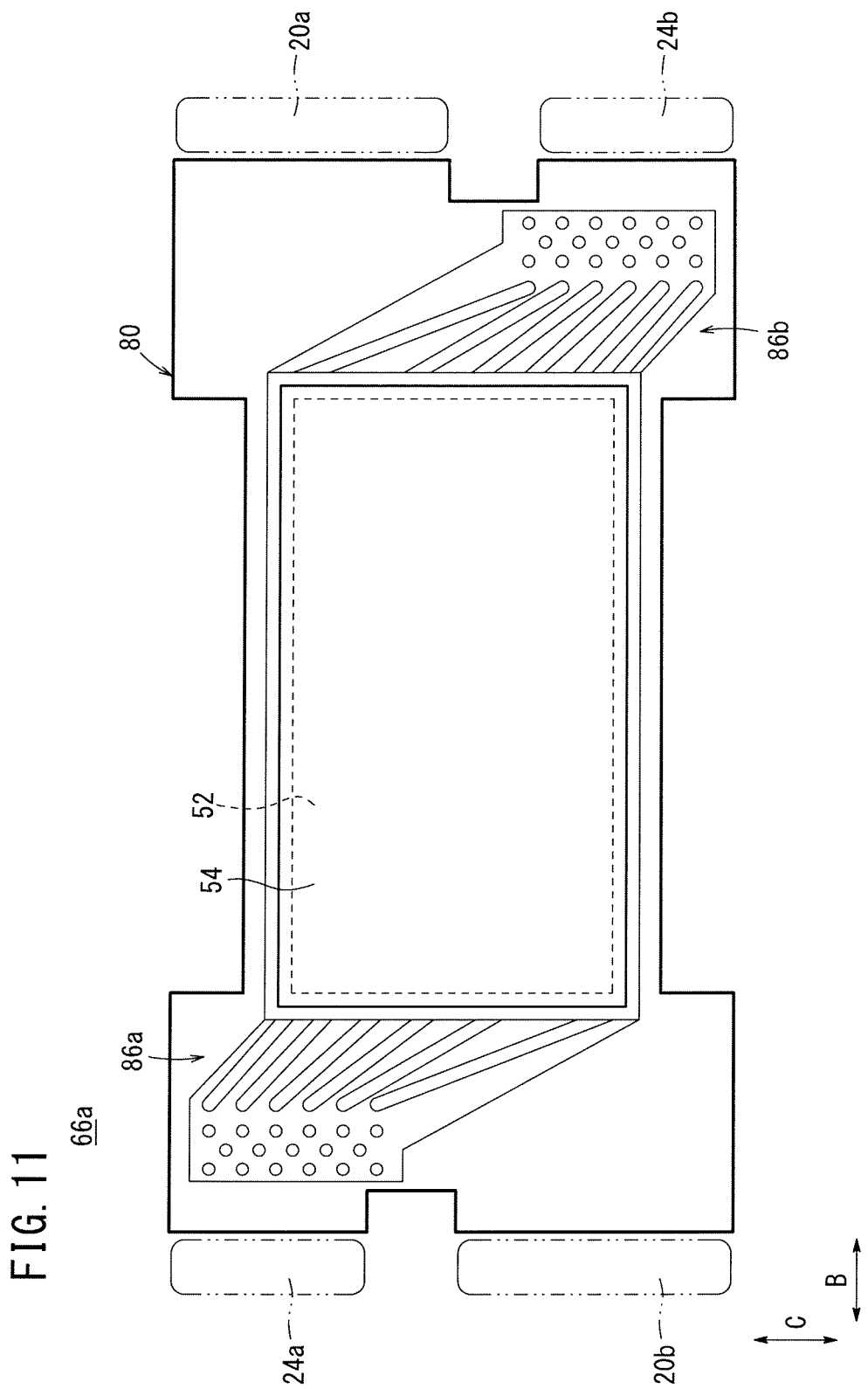
FIG. 11 is a front view showing a first membrane electrode assembly of the fuel cell.

As shown in FIG. 11, an inlet buffer 86a and outlet buffer 86b are provided on a surface of the first resin frame member 80 where the anode 54 is provided. The inlet buffer 86a is positioned between the fuel gas supply passage 24a and the first fuel gas flow field 32A, and the outlet buffer 86b is provided between the fuel gas discharge passage 24b and the first fuel gas flow field 32A.

As shown in FIG. 6, an inlet buffer 88a and an outlet buffer 88b are provided on a surface of the second resin frame member 82 where the cathode 52 is provided. The inlet buffer 88a is positioned between the oxygen-containing gas supply passage 20a and the second oxygen-containing gas flow field 26B, and the outlet buffer 88b is positioned between the oxygen-containing gas discharge passage 20b and the second oxygen-containing gas flow field 26B.

Figure 12:
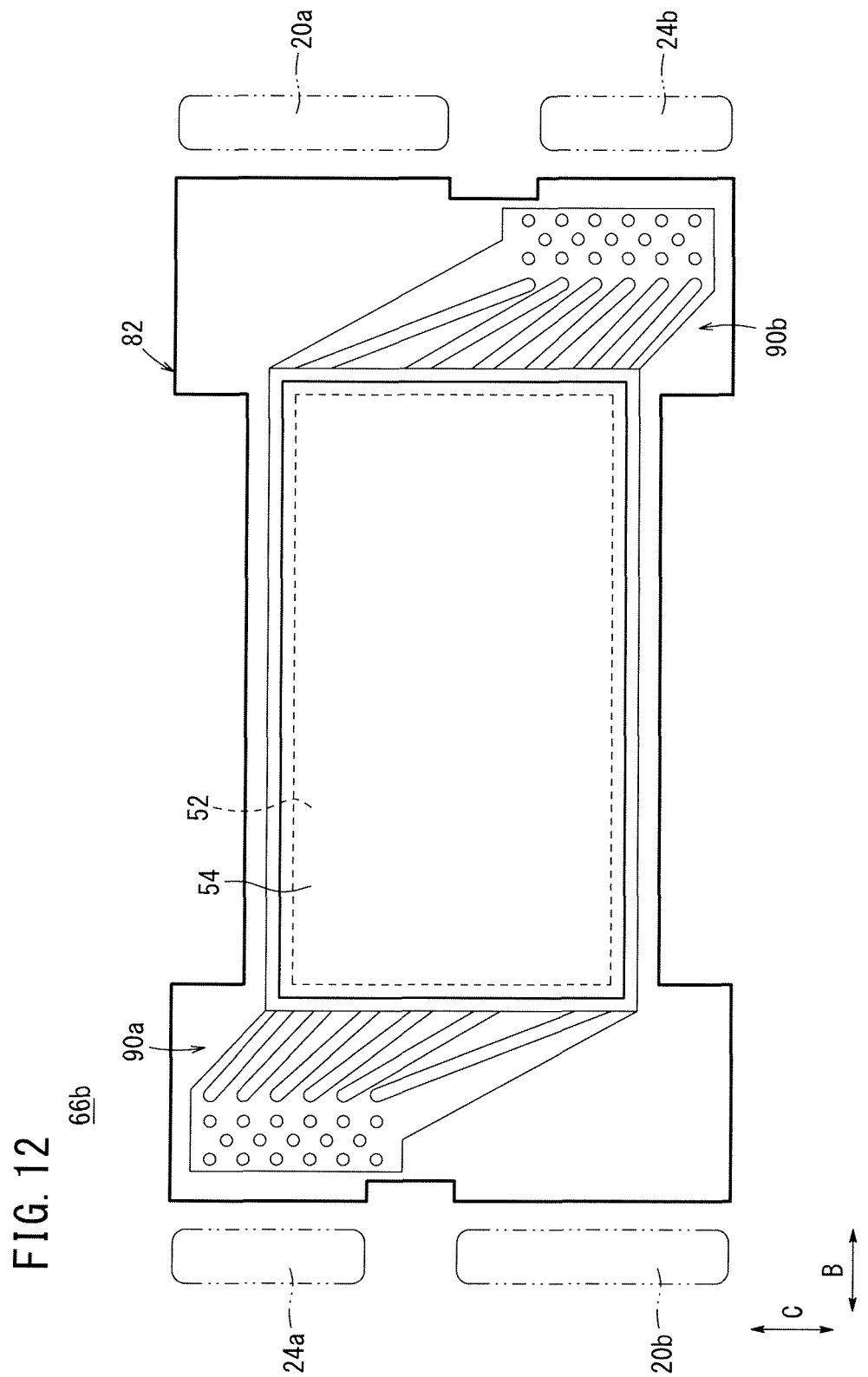
FIG. 12 is a front view showing a second membrane electrode assembly of the fuel cell.

As shown in FIG. 12, an inlet buffer 90a and an outlet buffer 90b are provided on a surface of the second resin frame member 82 where the anode 54 is provided. The inlet buffer 90a is positioned between the fuel gas supply passage 24a and the second fuel gas flow field 32B, and the outlet buffer 90b is positioned between the fuel gas discharge passage 24b and the second fuel gas flow field 32B.

The first oxygen-containing gas flow field 26A and the second oxygen-containing gas flow field 26B have the same structure as the oxygen-containing gas flow field 26 described above. The first fuel gas flow field 32A and the second fuel gas flow field 32B have the same structure as the fuel gas flow field 32 described above.

Operation of the fuel cell 60 will be described below.

Firstly, as shown in FIG. 6, an oxygen-containing gas is supplied to the oxygen-containing gas supply passage 20a, and a fuel gas is supplied to the fuel gas supply passage 24a. Further, a coolant is supplied to the pair of coolant supply passages 22a.

In the structure, the oxygen-containing gas flows from the oxygen-containing gas supply passage 20a through the inlet buffer 84a, and the oxygen-containing gas is supplied to the first oxygen-containing gas flow field 26A of the first separator 64. Further, the oxygen-containing gas flows from the oxygen-containing gas supply passage 20a through the inlet buffer 88a, and the oxygen-containing gas is supplied to the second oxygen-containing gas flow field 26B of the second separator 68.

The oxygen-containing gas flows along the first oxygen-containing gas flow field 26A in the horizontal direction indicated by the arrow B, and the oxygen-containing gas is supplied to the cathode 52 of the first membrane electrode assembly 66a. Further, the oxygen-containing gas flows along the second oxygen-containing gas flow field 26B in the direction indicated by the arrow B, and the oxygen-containing gas is supplied to the cathode 52 of the second membrane electrode assembly 66b.

As shown in FIGS. 6 and 11, the fuel gas flows from the fuel gas supply passage 24a through the supply holes 38a1, and the fuel gas is supplied to the inlet buffer 86a. The fuel gas flows the through the inlet buffer 86a, and the fuel gas is supplied to the first fuel gas flow field 32A of the second separator 68. Further, as shown in FIGS. 6 and 12, the fuel gas flows from the fuel gas supply passage 24a through the supply holes 38a2, and the fuel gas is supplied to the inlet buffer 90a. The fuel gas flows through the inlet buffer 90a, and the fuel gas is supplied to the second fuel gas flow field 32B of the third separator 70.

The fuel gas moves along the first fuel gas flow field 32A in the direction indicated by the arrow B, and the fuel gas is supplied to the anode 54 of the first membrane electrode assembly 66a. Further, the fuel gas moves along the second fuel gas flow field 32B in the direction indicated by the arrow B, and the fuel gas is supplied to the anode 54 of the second membrane electrode assembly 66b.

Thus, in each of the first membrane electrode assembly 66a and the second membrane electrode assembly 66b, the oxygen-containing gas supplied to each cathode 52 and the fuel gas supplied to each anode 54 are partially consumed in the electrochemical reactions at catalyst layers of the cathode 52 and the anode 54 for generating electricity.

Then, the oxygen-containing gas supplied to and partially consumed in the cathodes 52 of the first membrane electrode assembly 66a and the second membrane electrode assembly 66b is discharged from the outlet buffers 84b, 88b into the oxygen-containing gas discharge passage 20b (see FIG. 6).

The fuel gas supplied to and partially consumed in the anodes 54 of the first membrane electrode assembly 66a and the second membrane electrode assembly 66b flows from the outlet buffers 86b, 90b through the discharge holes 38b1, 38b2, and the fuel gas is discharged into the fuel gas discharge passage 24b.

As shown in FIG. 6, the coolant supplied to the pair of upper and lower coolant supply passages 22a is supplied into the coolant flow field 40. After the coolant temporarily flows inward in the direction indicated by the arrow C, the coolant moves in the direction indicated by the arrow B to cool the first membrane electrode assembly 66a and the second membrane electrode assembly 66b. After the coolant moves outward in the direction indicated by the arrow C, the coolant is supplied to the pair of the coolant discharge passages 22b.

In the second embodiment, for example, as shown in FIG. 10, the first fuel gas flow field 32A is provided on the surface 68a of the second separator 68. Further, the first fuel gas flow field 32A includes a plurality of corrugated flow grooves 32a and the flat flow field 32b. The corrugated flow grooves 32a extend in a wavy pattern in the horizontal direction. The flat flow field 32b is provided within a power generation area 33, at the lowermost position in the direction of the gravity. The bottom $32b_{DOWN}$ of the flat flow field 32b extends straight in the horizontal direction (see FIGS. 7 and 8).

In the structure, when the fuel gas flows along each of the corrugated flow grooves 32a of the first fuel gas flow field 32A in the horizontal direction, water produced by power generation reaction is diffused backward from the second oxygen-containing gas flow field 26B. This water moves down to the lower side of the first fuel gas flow field 32A in the direction of the gravity, and on the lower side of the first fuel gas flow field 32A, the quantity of heat radiated to the outside becomes large, and the temperature is lowered. Consequently, the amount of the condensed water is increased.

The flat flow field 32b is provided at the lowermost position of the first fuel gas flow field 32A in the direction of the gravity. Thus, the water which has moved down to the lower side in the direction of the gravity from each of the corrugated flow grooves 32a through the carbon paper or the like and the condensed water on the lower side of the first fuel gas flow field 32A move smoothly along the bottom $32b_{DOWN}$ of the flat flow field 32b. Then, the water is discharged from the first fuel gas flow field 32A, i.e., from the power generation area 33.

Thus, the same advantages as in the case of the first embodiment can be obtained. For example, though the water produced in the power generation reaction tends to be retained as stagnant water on the lower side of the first fuel gas flow field 32A in the direction of the gravity, with the simple structure, the water can be discharged from the first fuel gas flow field 32A easily and reliably.

Figure 13:
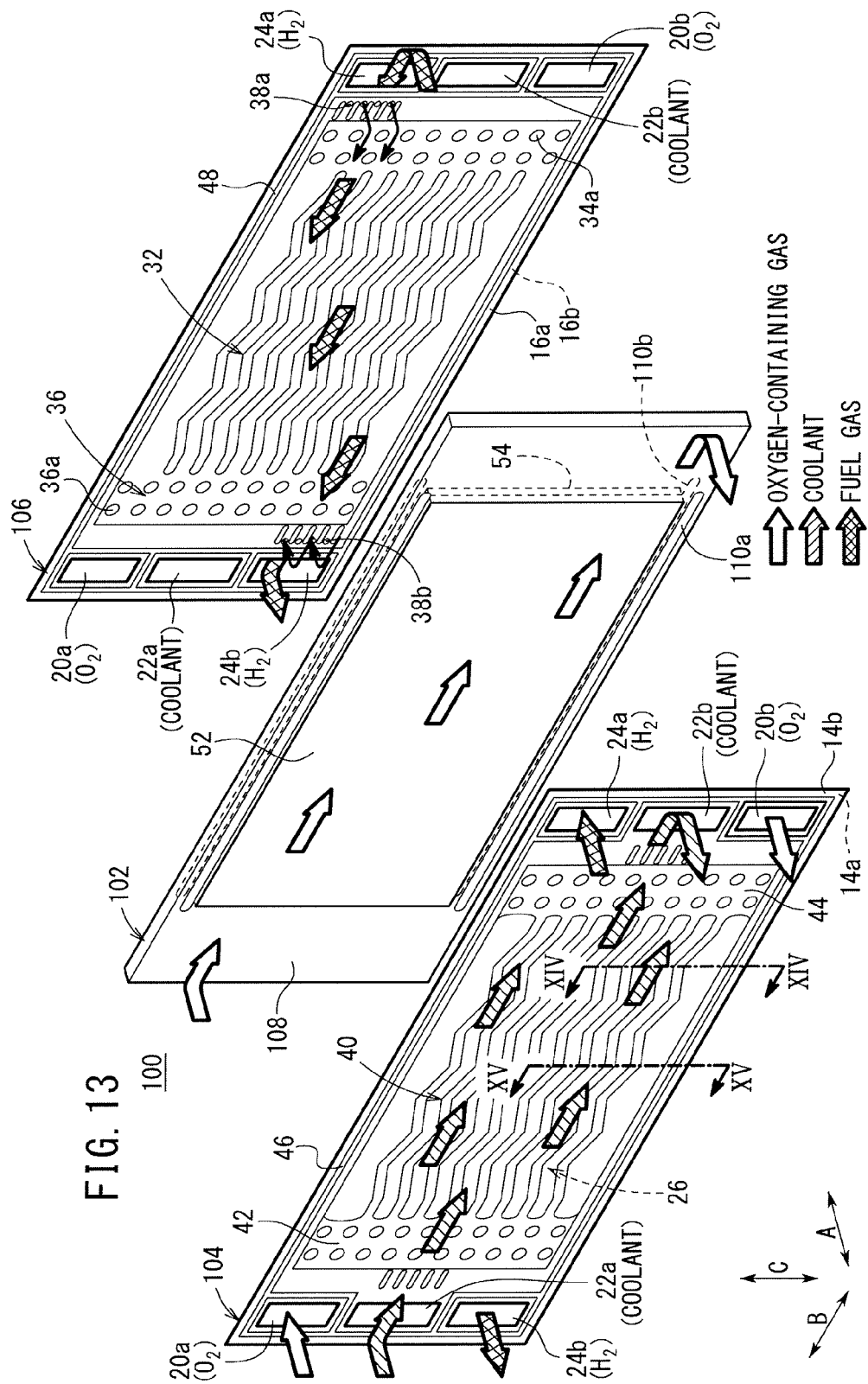
FIG. 13 is an exploded perspective view showing main components of a fuel cell according to a third embodiment of the present invention.
Figure 14:
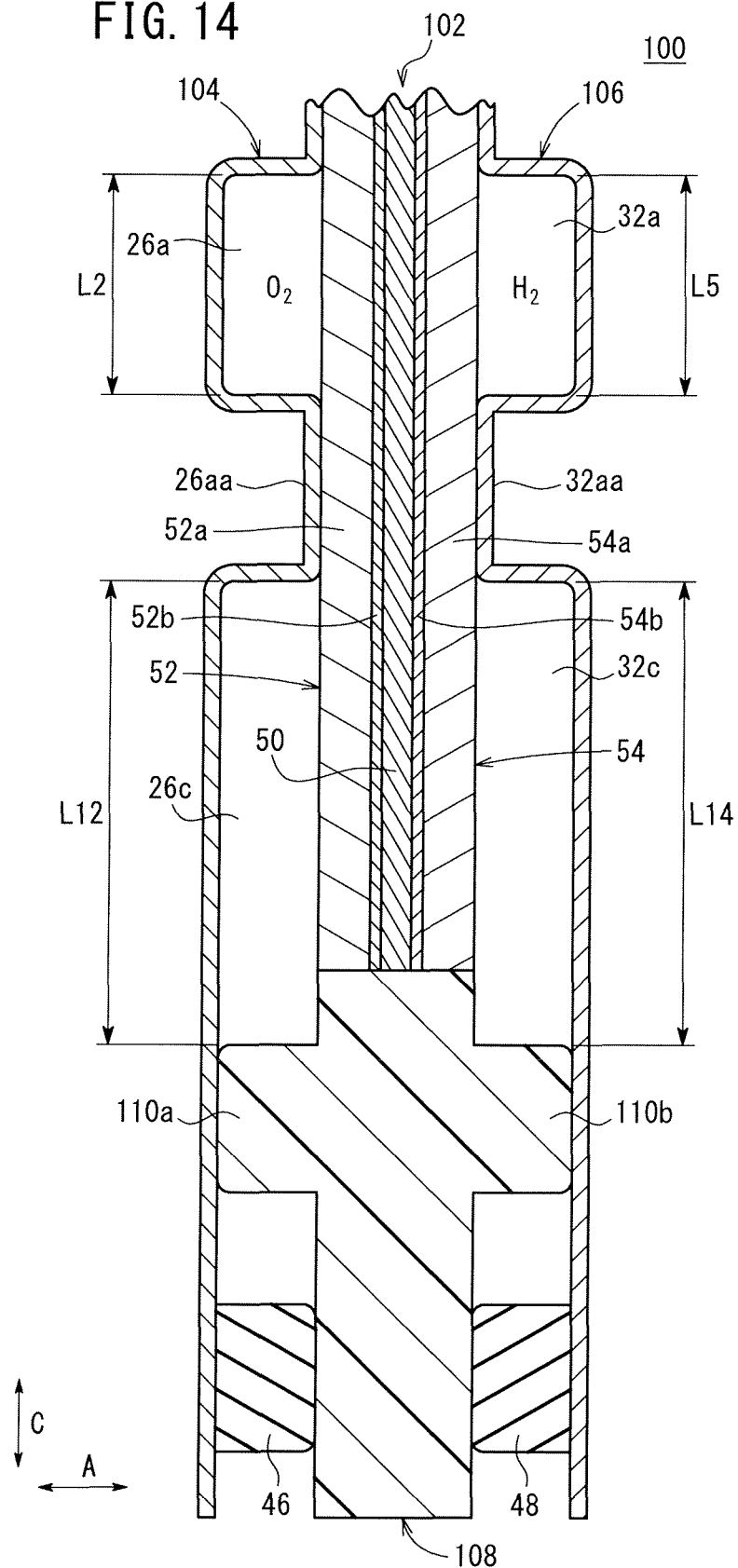
FIG. 14 is a cross sectional view showing the fuel cell, taken along a line XIV-XIV in FIG. 13.
Figure 15:
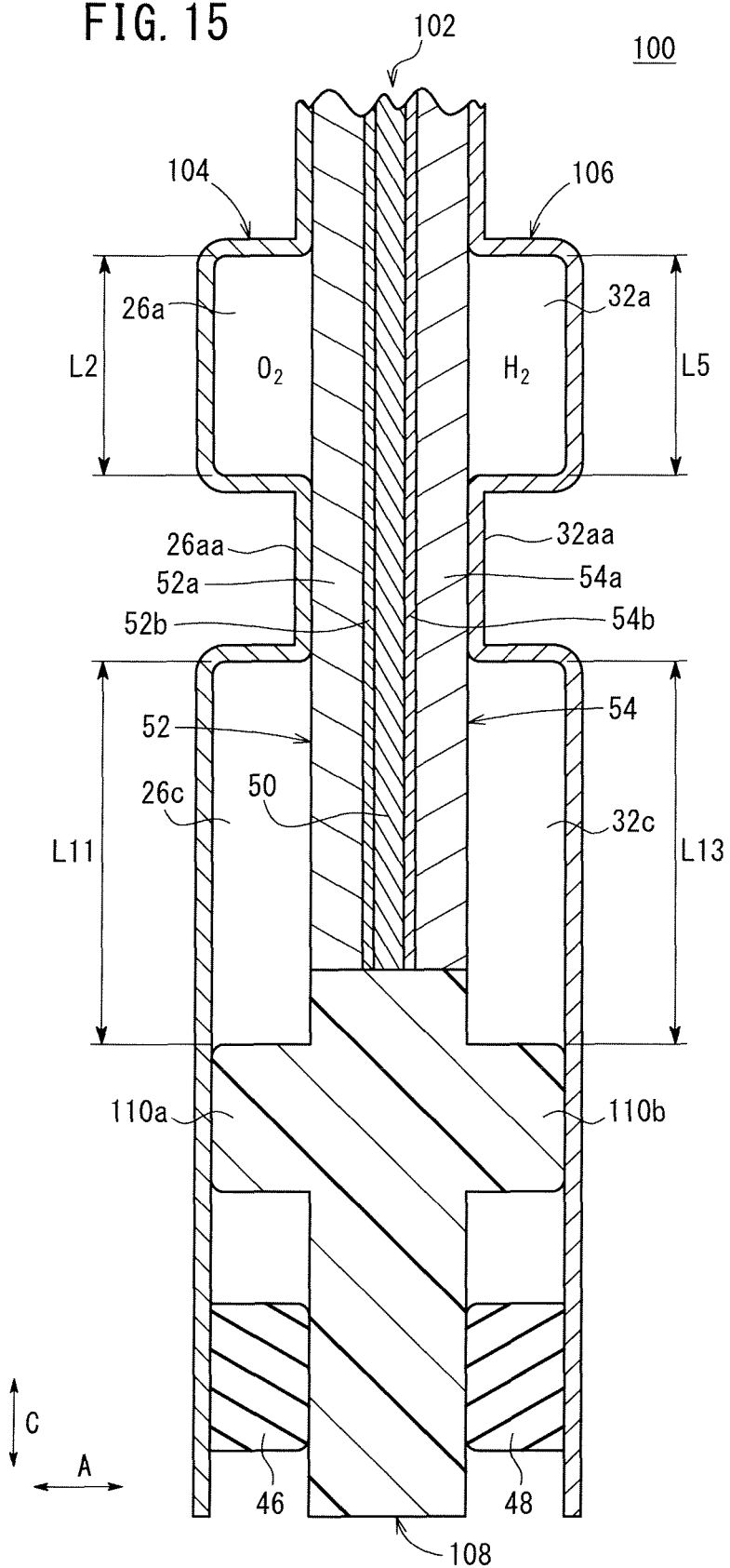
FIG. 15 is a cross sectional view showing the fuel cell, taken along a line XV-XV in FIG. 13.

Fuel cells 100 according to a third embodiment of the present invention shown in FIGS. 13 to 15 are stacked together in a horizontal direction indicated by an arrow A to form a fuel cell stack, e.g., mounted in a vehicle.

The fuel cell 100 has a laterally elongated shape, and includes a membrane electrode assembly 102 and a first separator (cathode side separator) 104 and a second separator (anode side separator) 106 sandwiching the membrane electrode assembly 102. The first separator 104 and the second separator 106 are formed by corrugating metal thin plates by press forming to have corrugated shapes in cross section (FIGS. 14 and 15).

The first separator 104 has a plurality of corrugated flow grooves 26a forming an oxygen-containing gas flow field 26. A flat surface is provided below a corrugated ridge 26aa at the lowermost position. Likewise, a flat surface is provided above a corrugated flow groove 26a at the uppermost position.

The second separator 106 has a plurality of corrugated flow grooves 32a forming a fuel gas flow field 32. A flat surface is provided below a corrugated ridge 32aa at the lowermost position. Likewise, a flat surface is provided above a corrugated flow groove 32a at the uppermost position.

The membrane electrode assembly 102 includes a resin frame member 108 around the solid polymer electrolyte membrane 50, the cathode 52, and the anode 54. A straight ridge 110a is expanded integrally from the resin frame member 108 to face the oxygen-containing gas flow field 26. The straight ridge 110a extends in the direction indicated by the arrow B, and positioned below the corrugated ridge 26aa at the lowermost position. A flat flow field 26c is formed between the straight ridge 110a and the corrugated ridge 26aa.

As shown in FIGS. 14 and 15, the minimum flow field width L11 of the flat flow field 26c is smaller than the maximum flow width L12 of the flat flow field 26c (L11<L12). The minimum flow field width L11 of the flat flow field 26c is larger than the flow field width L2 of the corrugated flow groove 26a between the corrugated ridges 26aa (L2<L11).

A straight ridge 110b is expanded integrally from the resin frame member 108 to face the fuel gas flow field 32. The straight ridges 110b extend in the direction indicated by the arrow B, and positioned below the corrugated ridge 32aa at the lowermost position. A flat flow field 32c is formed between the straight ridge 110b and the corrugated ridge 32aa.

As shown in FIGS. 14 and 15, the minimum flow field width L13 of the flat flow field 32c is smaller than the maximum flow width L14 of the flat flow field 32c (L13<L14). The minimum flow field width L13 of the flat flow field 32c is larger than the flow field width L5 of the corrugated flow groove 32a between the corrugated ridges 32aa (L5<L13).

In the third embodiment, the oxygen-containing gas flow field 26 includes the plurality of corrugated flow grooves 26a and the flat flow field 26c. The corrugated flow grooves 26a extend in a wavy pattern in the horizontal direction. The flat flow field 26c is provided within a power generation area (not shown), at the lowermost position in the direction of the gravity. The bottom of the flat flow field 26c extends straight in the horizontal direction.

Therefore, for example, the water which has moved downward in the direction of the gravity from each of the corrugated flow grooves 26a through the carbon paper or the like and the condensed water on the lower side of the oxygen-containing gas flow field 26 move smoothly along the flat flow field 26c, i.e., the straight ridge 110a. Then, the water is discharged from the oxygen-containing gas flow field 26. Thus, the same advantages as in the case of the first embodiment are obtained. For example, though the water produced in the power generation reaction tends to be retained as stagnant water on the lower side of the oxygen-containing gas flow field 26 in the direction of the gravity, with the simple structure, the water can be discharged from the oxygen-containing gas flow field 26 easily and reliably.

Figure 16:
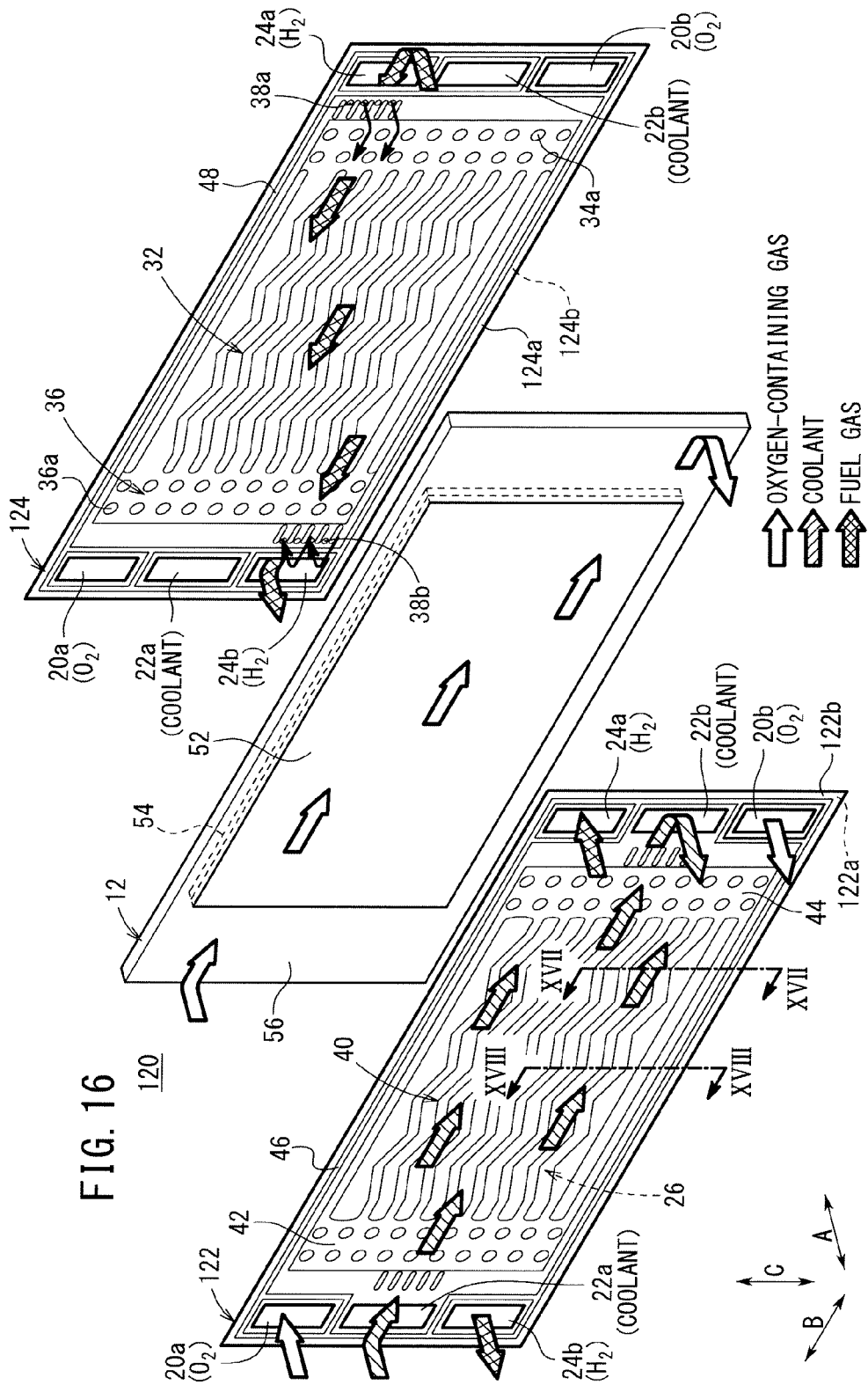
FIG. 16 is an exploded perspective view showing main components of a fuel cell according to a fourth embodiment of the present invention.
Figure 17:
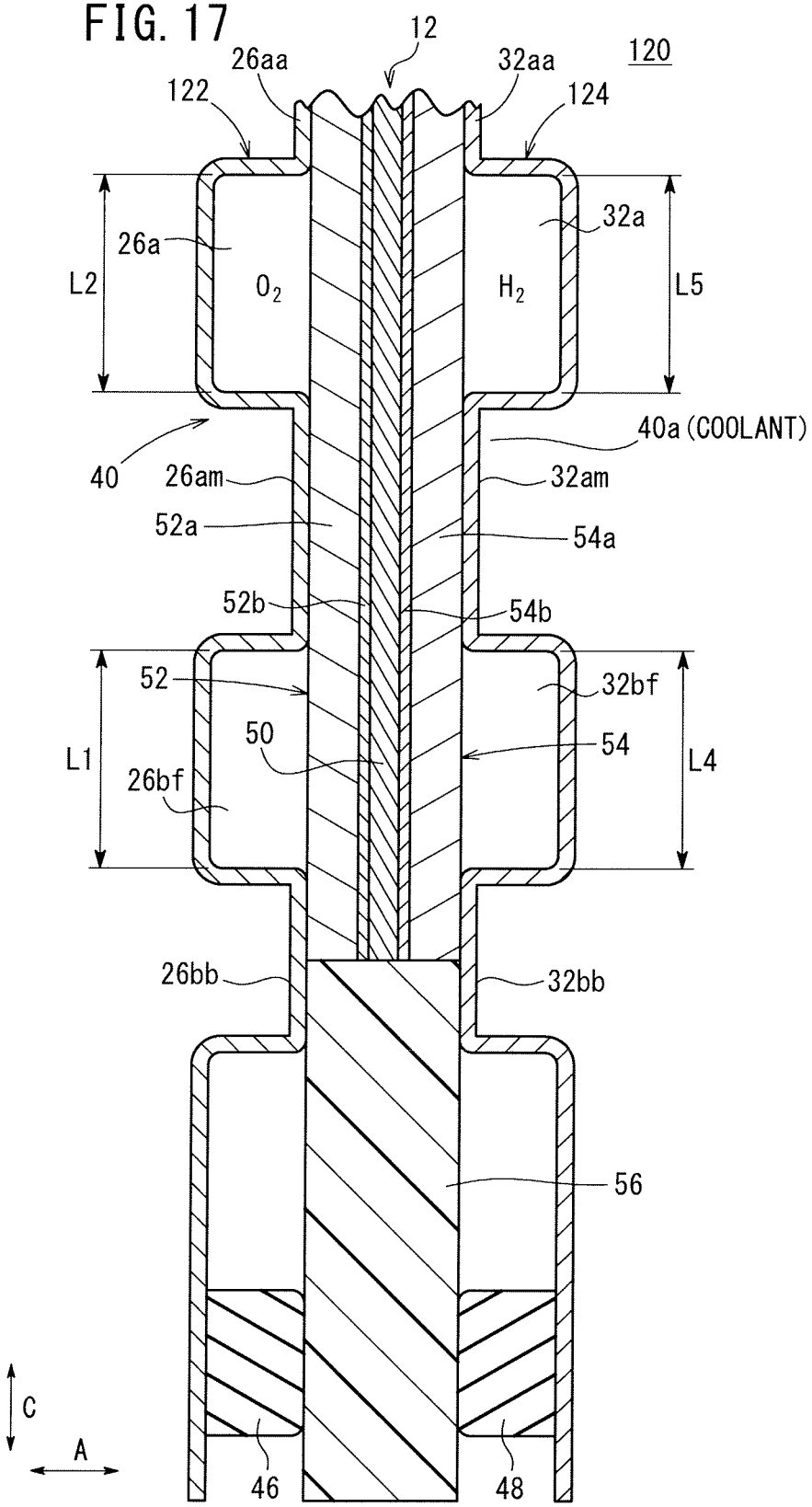
FIG. 17 is a cross sectional view showing the fuel cell, taken along a line XVII-XVII in FIG. 16.
Figure 18:
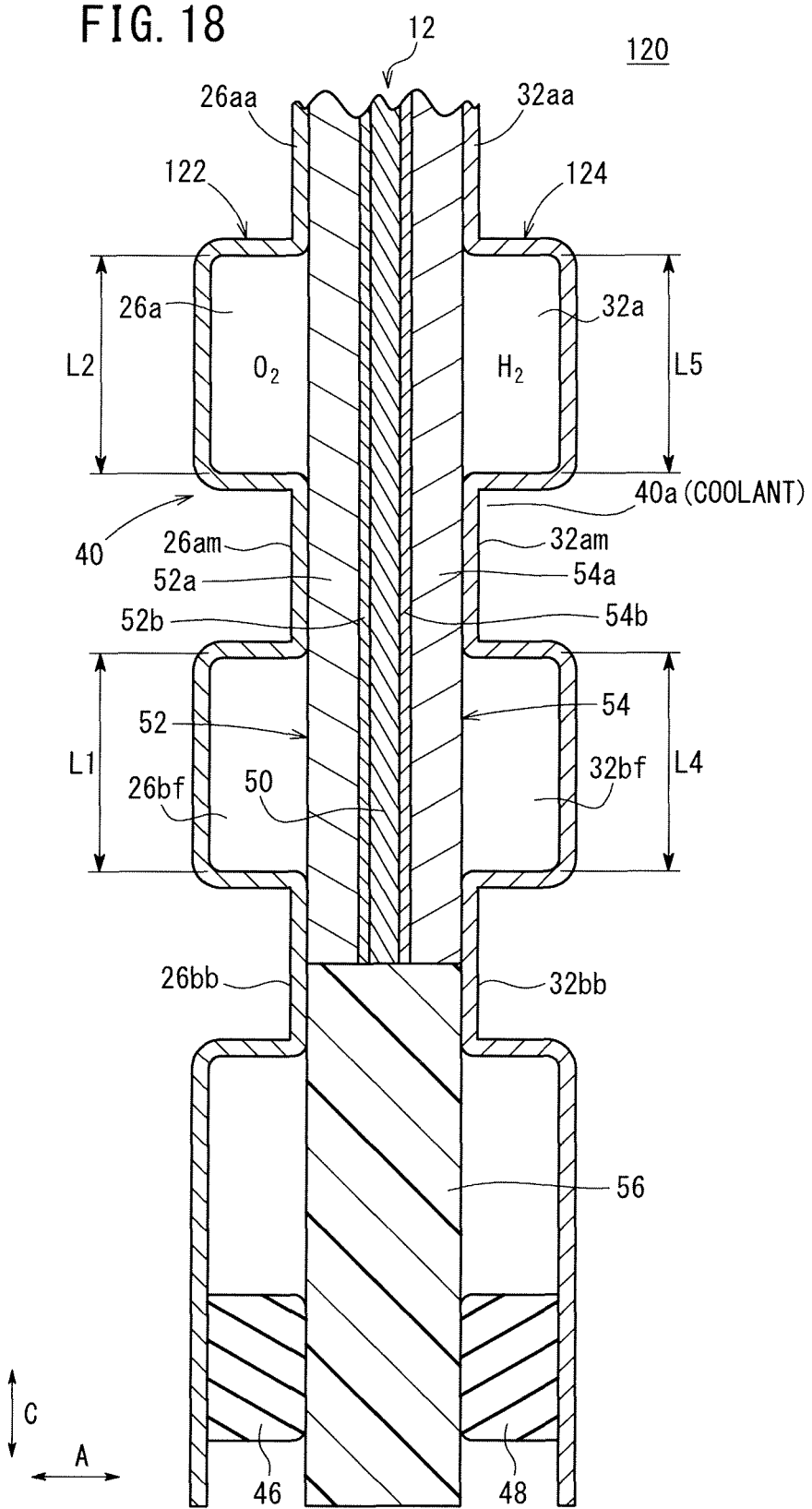
FIG. 18 is a cross sectional view showing the fuel cell, taken along a line XVIII-XVIII in FIG. 16.

Fuel cells 120 according to a fourth embodiment of the present invention shown in FIGS. 16 to 18 are stacked together in a horizontal direction indicated by an arrow A to form a fuel cell stack, e.g., mounted in a vehicle.

The fuel cell 120 has a laterally elongated shape, and includes a membrane electrode assembly 12, a first separator (cathode side separator) 122 and a second separator (anode side separator) 124 sandwiching the membrane electrode assembly 12. The first separator 122 and the second separator 124 are formed by corrugating metal thin plates by press forming to have corrugated shapes in cross section (FIGS. 17 and 18).

Figure 19:
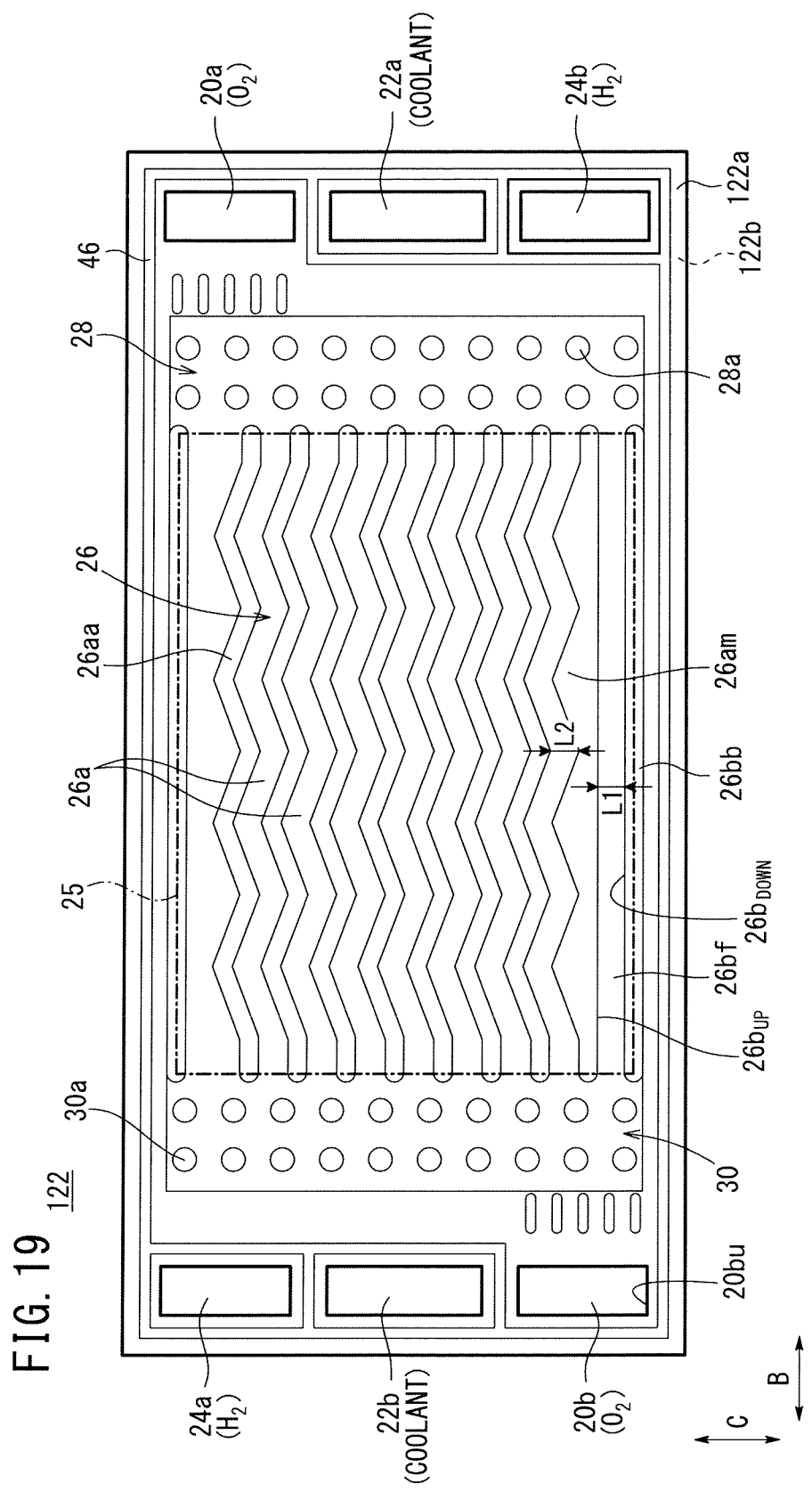
FIG. 19 is a front view showing a first separator of the fuel cell.

As shown in FIG. 19, the first separator 122 has a plurality of corrugated flow grooves 26a forming an oxygen-containing gas flow field 26 on its surface 122a facing the membrane electrode assembly 12. A mountain shaped ridge 26am is provided below a corrugated ridge 26aa at the lowermost position. The upper surface of the mountain shaped ridge 26am has a zigzag pattern or a wavy pattern in the horizontal direction, and the lower surface of the mountain shaped ridge 26am has a straight pattern in the horizontal direction.

A flat flow field 26bf is provided below the mountain shaped ridge 26am. The flat flow field 26bf is formed between a flat ridge 26bb protruding from the surface 122a and the adjacent mountain shaped ridge 26am. A bottom $26b_{DOWN}$ of the flat flow field 26bf extends straight in the horizontal direction along the upper surface of the flat ridge 26bb, and the ceiling $26b_{UP}$ of the flat flow field 26bf extends straight in the horizontal direction along the lower surface of the mountain shaped ridge 26am. The flow field width L1 of the flat flow field 26bf is constant in the horizontal direction.

Figure 20:
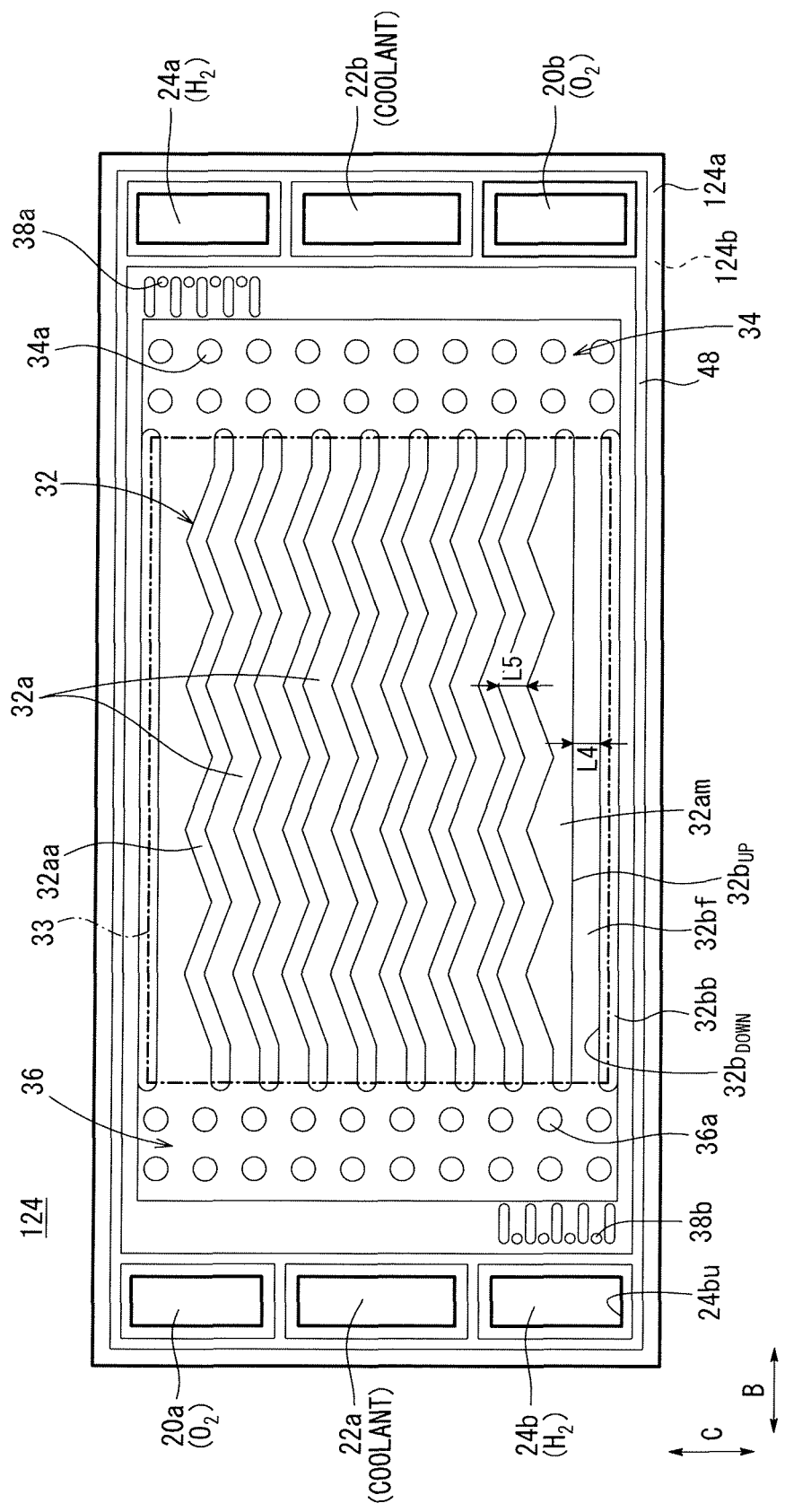
FIG. 20 is a front view showing a second separator of the fuel cell.

As shown in FIG. 20, the second separator 124 has a plurality of corrugated flow grooves 32a forming the fuel gas flow field 32 on its surface 124a facing the membrane electrode assembly 12. A mountain shaped ridge 32am is provided below a corrugated ridge 32aa at the lowermost position. The upper surface of the mountain shaped ridge 32am has a zigzag pattern or a wavy pattern in the horizontal direction, and the lower surface of the mountain shaped ridge 32am has a straight pattern in the horizontal direction. The flow field width L5 of the corrugated flow grooves 32a between the corrugated ridges 32aa of the fuel gas flow field 32, and the flow field width L2 of the corrugated flow grooves 26a between the corrugated rides 26aa of the oxygen-containing gas flow field 26 are constant, respectively (see FIGS. 17 to 20).

A flat flow field 32bf is provided below the mountain shaped ridge 32am. The flat flow field 32bf is formed between the flat ridge 32bb protruding from the surface 124a and the adjacent mountain shaped ridge 32am. A bottom $32b_{DOWN}$ of the flat flow field 32bf extends straight in the horizontal direction along the upper surface of the flat ridge 32bb, and the ceiling $32b_{UP}$ of the flat flow field 32bf extends straight in the horizontal direction along the lower surface of the mountain shaped ridge 32am. The flow field width L4 of the flat flow field 32bf is constant in the horizontal direction.

As shown in FIGS. 16 to 18, a coolant flow field 40 is formed between a surface 122b of the first separator 122 and a surface 124b of the second separator 124. Coolant flow grooves 40a having variable flow field width is provided on the lower side of the coolant flow field 40, on the back surfaces of the mountain shaped ridge 26am and 32am (see FIGS. 17 and 18).

In the fourth embodiment, the same advantages as in the cases of the first to third embodiments are obtained. For example, though the water produced in the power generation reaction tends to be retained as stagnant water on the lower side of the oxygen-containing gas flow field 26 in the direction of the gravity, with the simple structure, the water can be discharged from the oxygen-containing gas flow field 26 easily and reliably.

Figure 21:
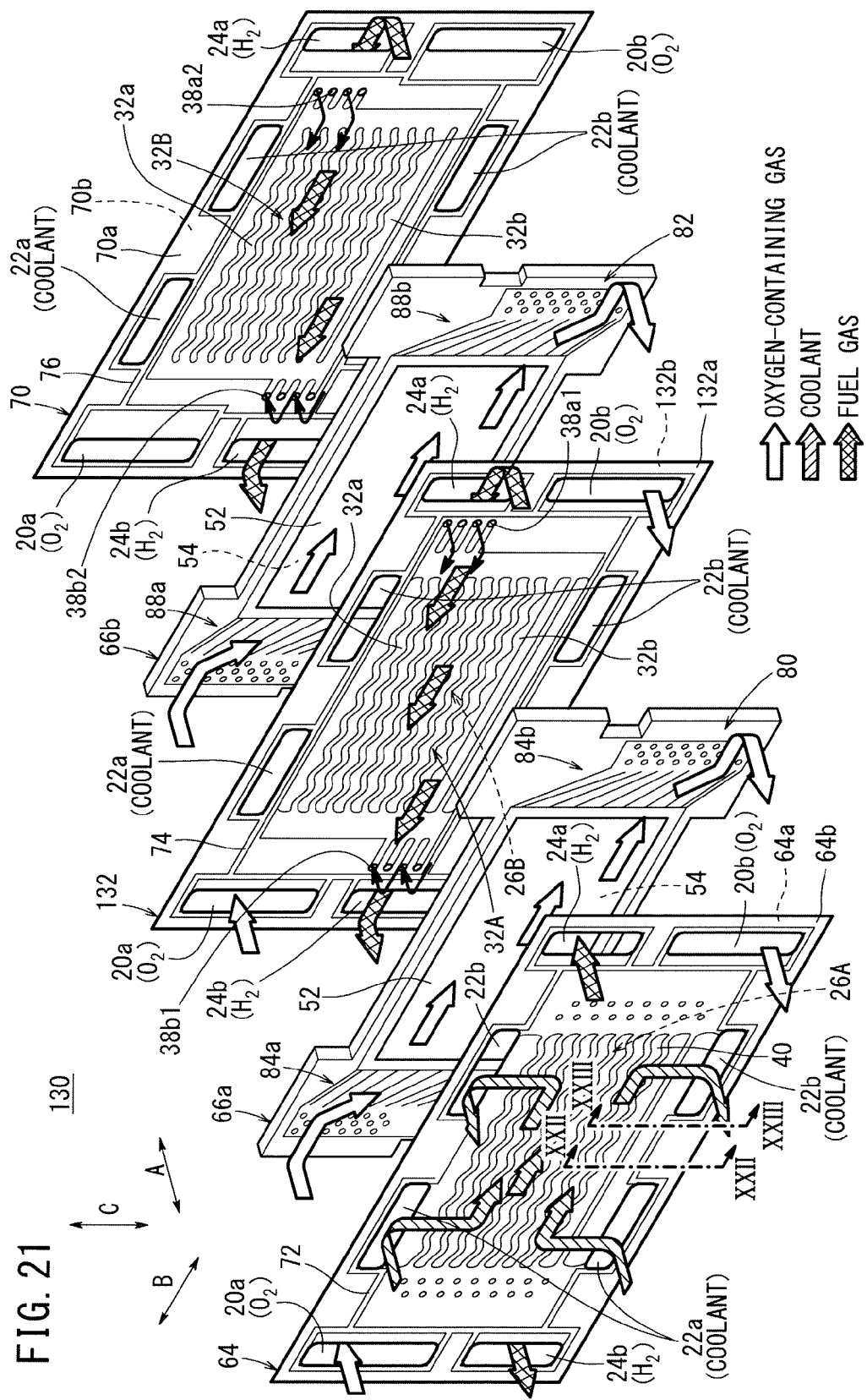
FIG. 21 is an exploded perspective view showing main components of a fuel cell according to a fifth embodiment of the present invention.
Figure 22:
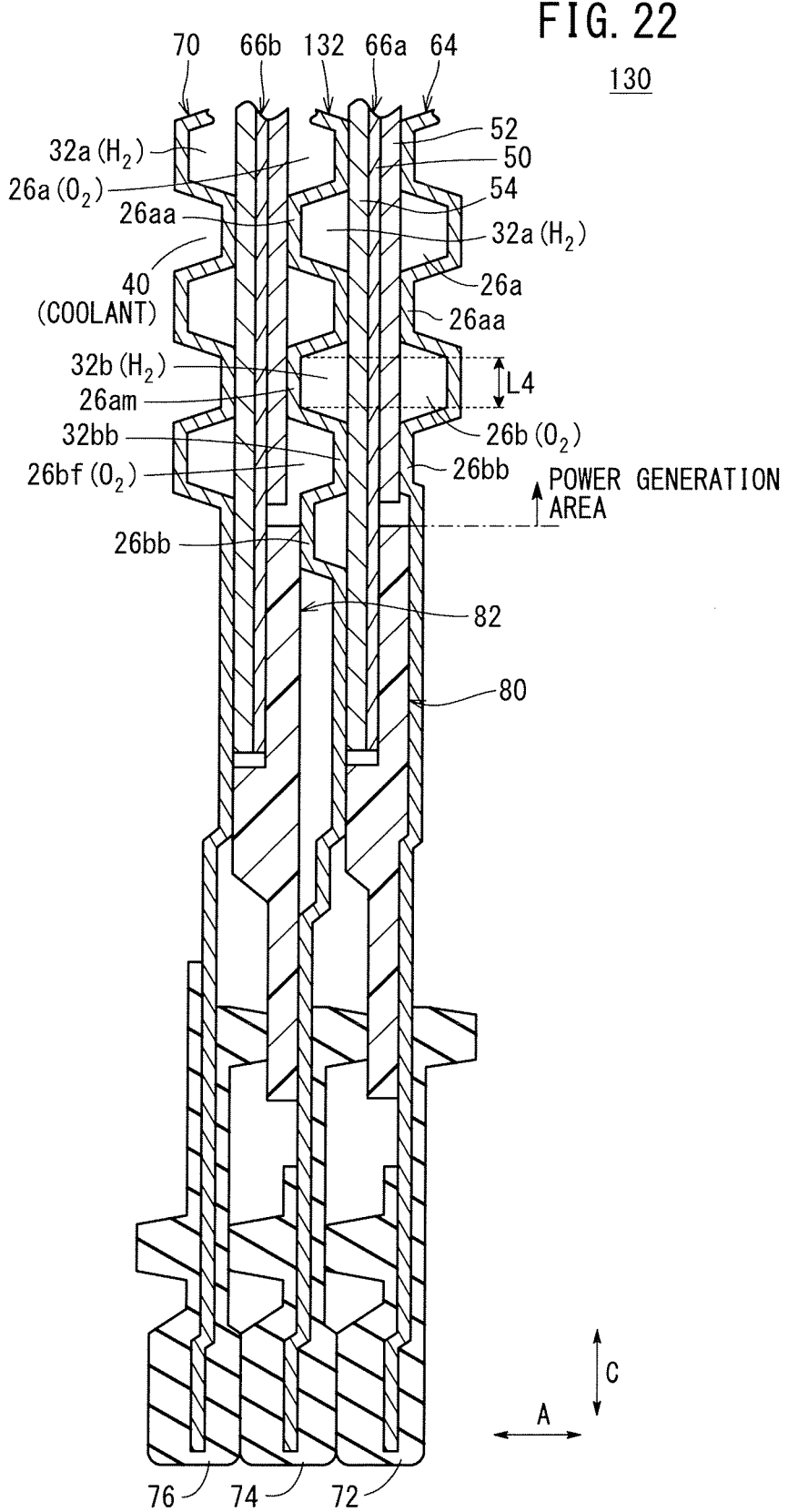
FIG. 22 is a cross sectional view showing the fuel cell, taken along a line XXII-XXII in FIG. 21.
Figure 23:
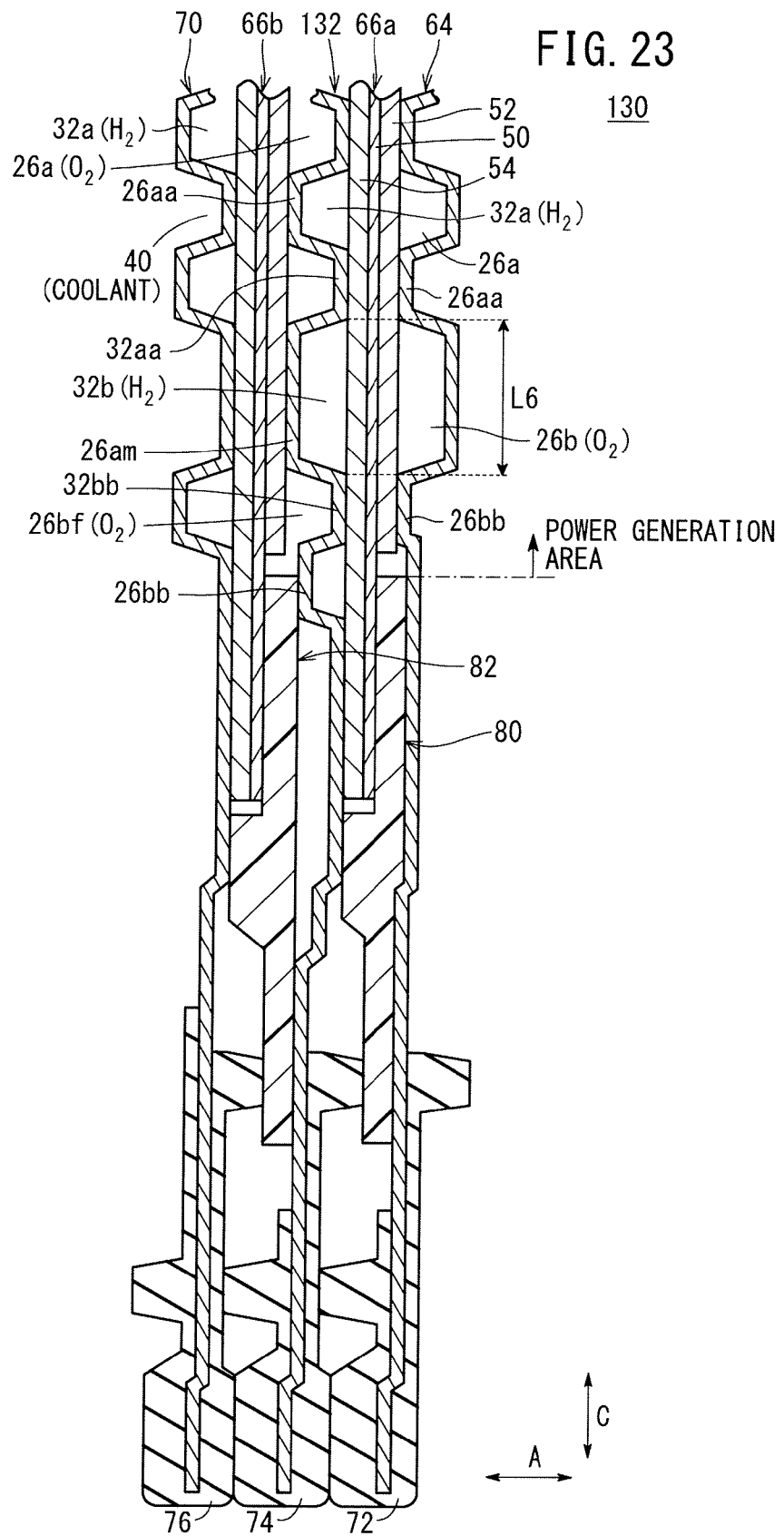
FIG. 23 is a cross sectional view showing the fuel cell, taken along a line XXIII-XXIII in FIG. 21.

A plurality of fuel cells 130 according to a fifth embodiment of the present invention shown in FIGS. 21 to 23 are stacked together in the horizontal direction indicated by the arrow A to form a fuel cell stack, e.g., mounted in a vehicle. The constituent elements are identical to those of the fuel cell 60 according to the second embodiment are labeled with the same reference numerals, and detailed descriptions thereof will be omitted.

The fuel cell 130 includes a first separator 64, a first membrane electrode assembly 66a, a second separator 132, a second membrane electrode assembly 66b, and a third separator 70. The second separator 132 is a laterally elongated metal plate such as a steel plate, a stainless steel plate, an aluminum plate, a plated steel sheet, or a metal plate having anti-corrosive surfaces by surface treatment. The second separator 132 has a rectangular shape in a plan view, and is formed by corrugating a metal thin plate by press forming to have a corrugated shape in cross section.

Figure 24:
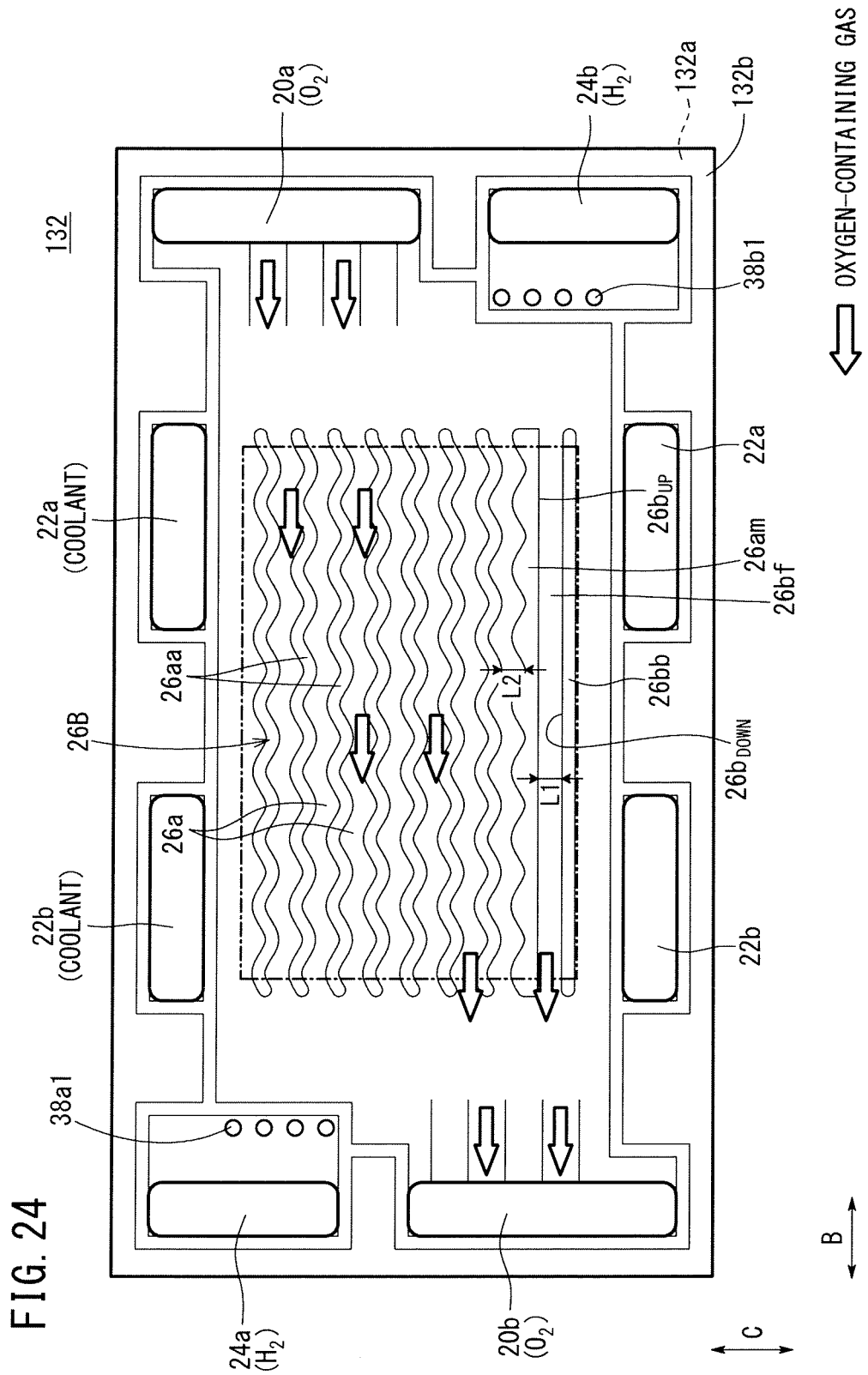
FIG. 24 is a front view showing one surface of a second separator of the fuel cell.

The second separator 132 has a first fuel gas flow field 32A on its surface 132a facing the first membrane electrode assembly 66a, and has a second oxygen-containing gas flow field 26B on its surface 132b facing the second membrane electrode assembly 66b. As shown in FIG. 24, the second oxygen-containing gas flow field 26B includes a plurality of corrugated flow grooves 26a.

A mountain shaped ridge 26am is provided below a corrugated ridge 26aa at the lowermost position, and a flat flow field 26bf is provided below the mountain shaped ridge 26am. The mountain shaped ridge 26am and the flat flow field 26bf have the same structure as those of the fuel cell 120 according to the fourth embodiment.

Figure 25:
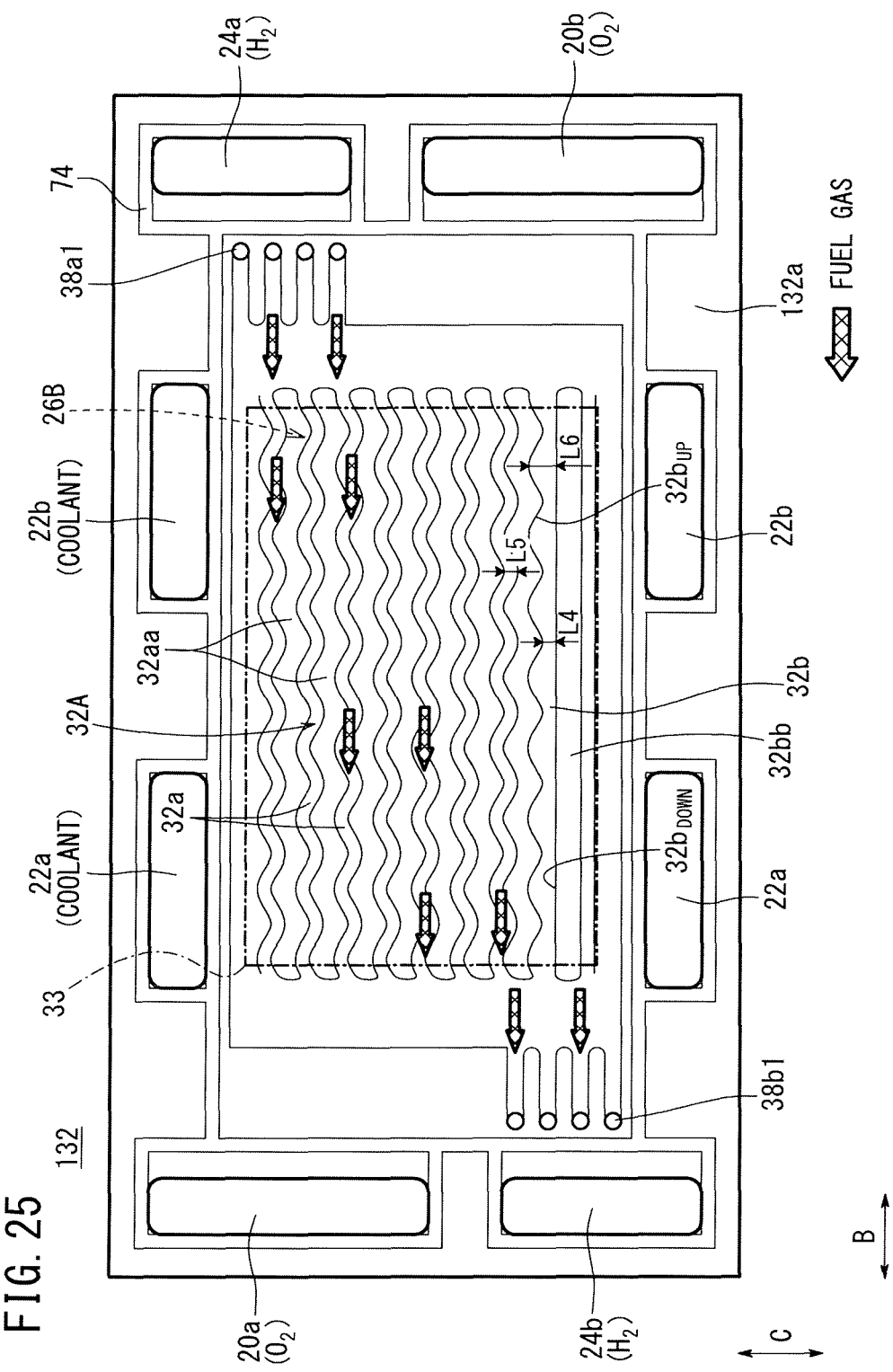
FIG. 25 is a front view showing another surface of the second separator of the fuel cell.

As shown in FIG. 25, a first fuel gas flow field 32A is formed on the surface 132a of the second separator 132, on the back surface of the second oxygen-containing gas flow field 26B. A flat flow field 32b is formed below a corrugated flow groove 32a at the lowermost position, on the back surface of the mountain shaped ridge 26am. The bottom $32b_{DOWN}$ of the flat flow field 32b extends straight in the horizontal direction, and the ceiling $32b_{UP}$ of the flat flow field 32b has a vertically zigzag pattern or wavy pattern.

In the first embodiment, the same advantages as in the cases of the first to fourth embodiments are obtained. For example, though the water produced in the power generation reaction tends to be retained as stagnant water on the lower side of the second oxygen-containing gas flow field 26B in the direction of the gravity, with the simple structure, the water can be discharged from the second oxygen-containing gas flow field 26B easily and reliably.

Figure 26:
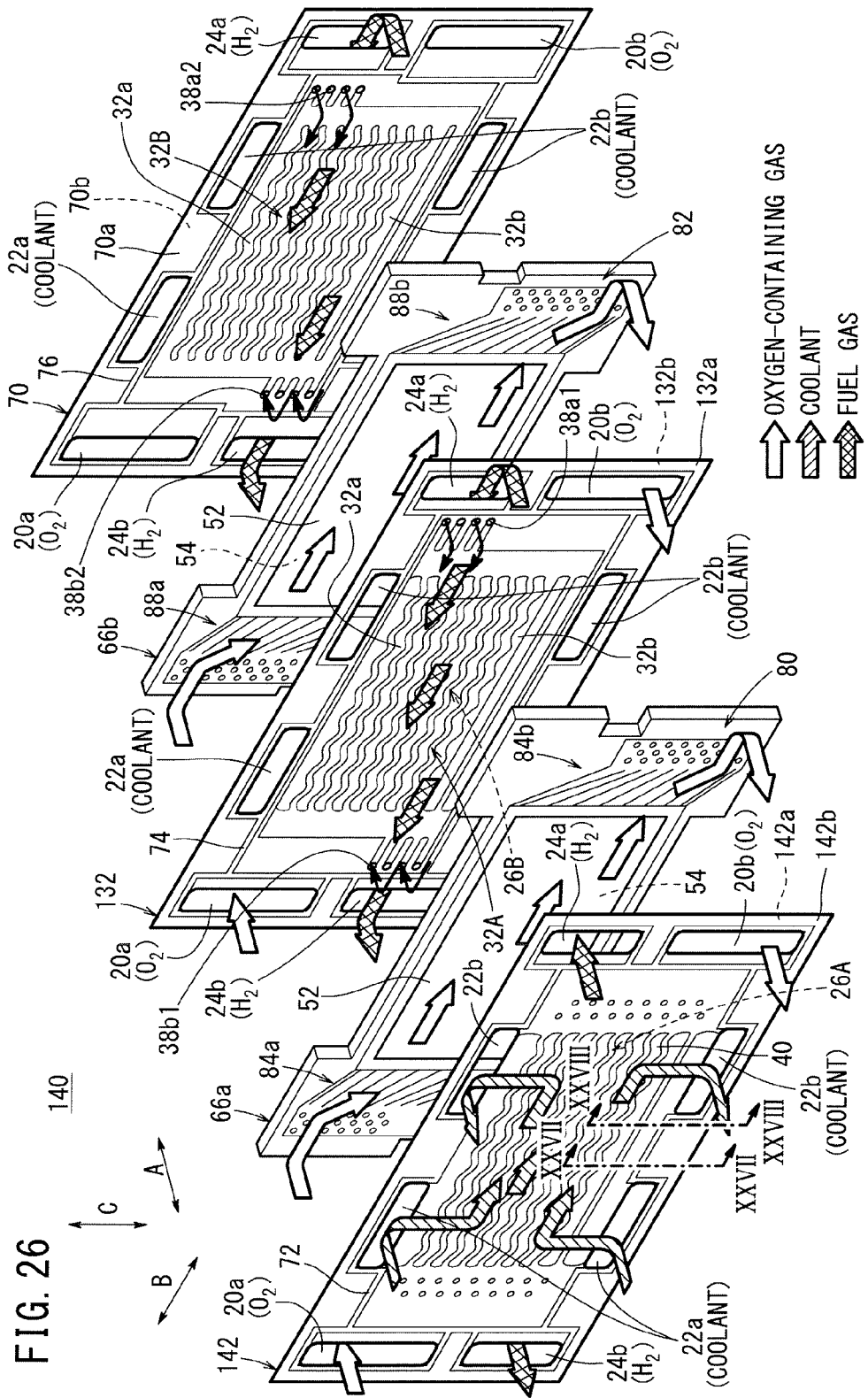
FIG. 26 is an exploded perspective view showing main components of a fuel cell according to a sixth embodiment of the present invention.
Figure 27:
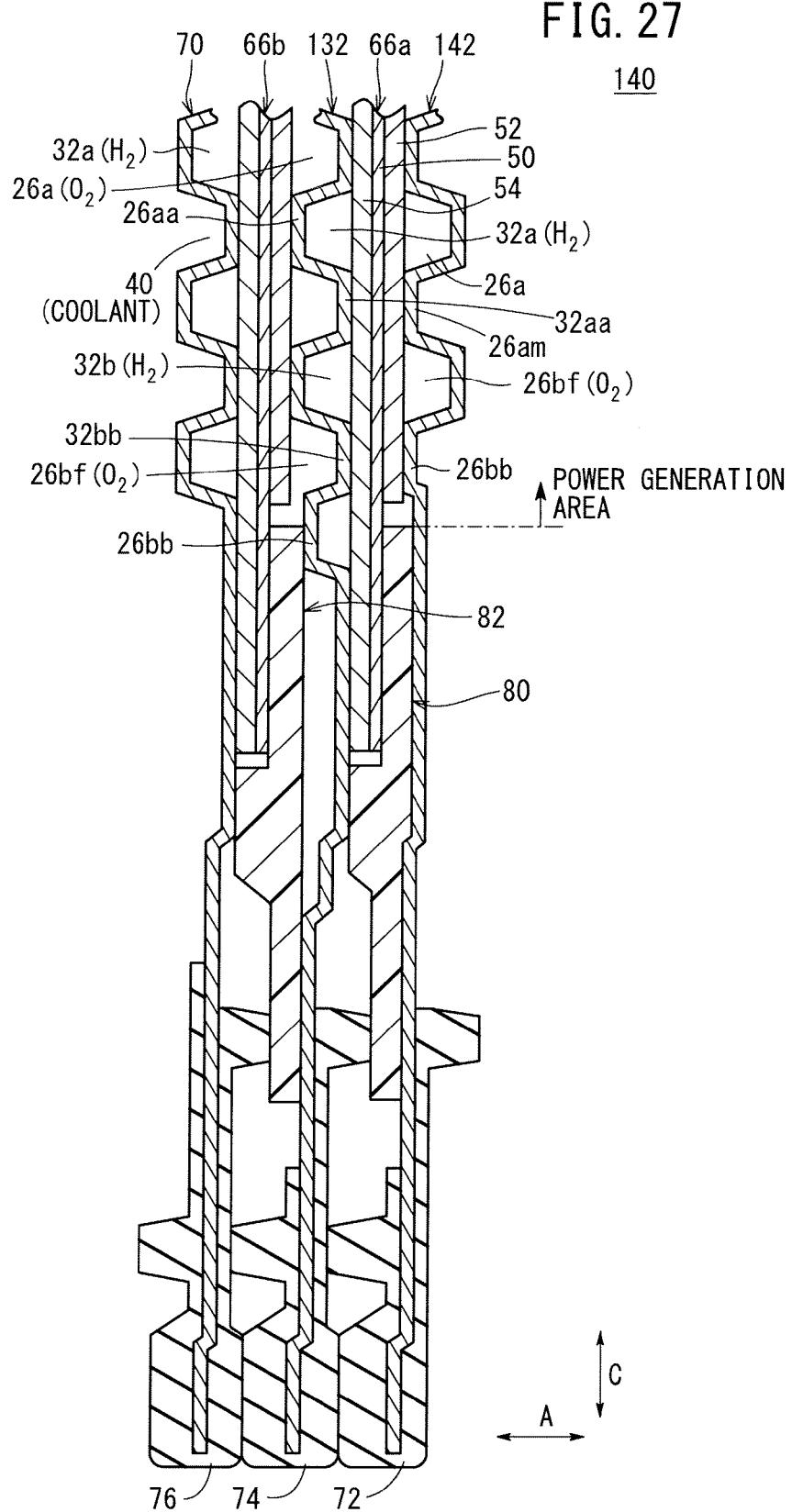
FIG. 27 is a cross sectional view showing the fuel cell, taken along a line XXVII-XXVII in FIG. 26.
Figure 28:
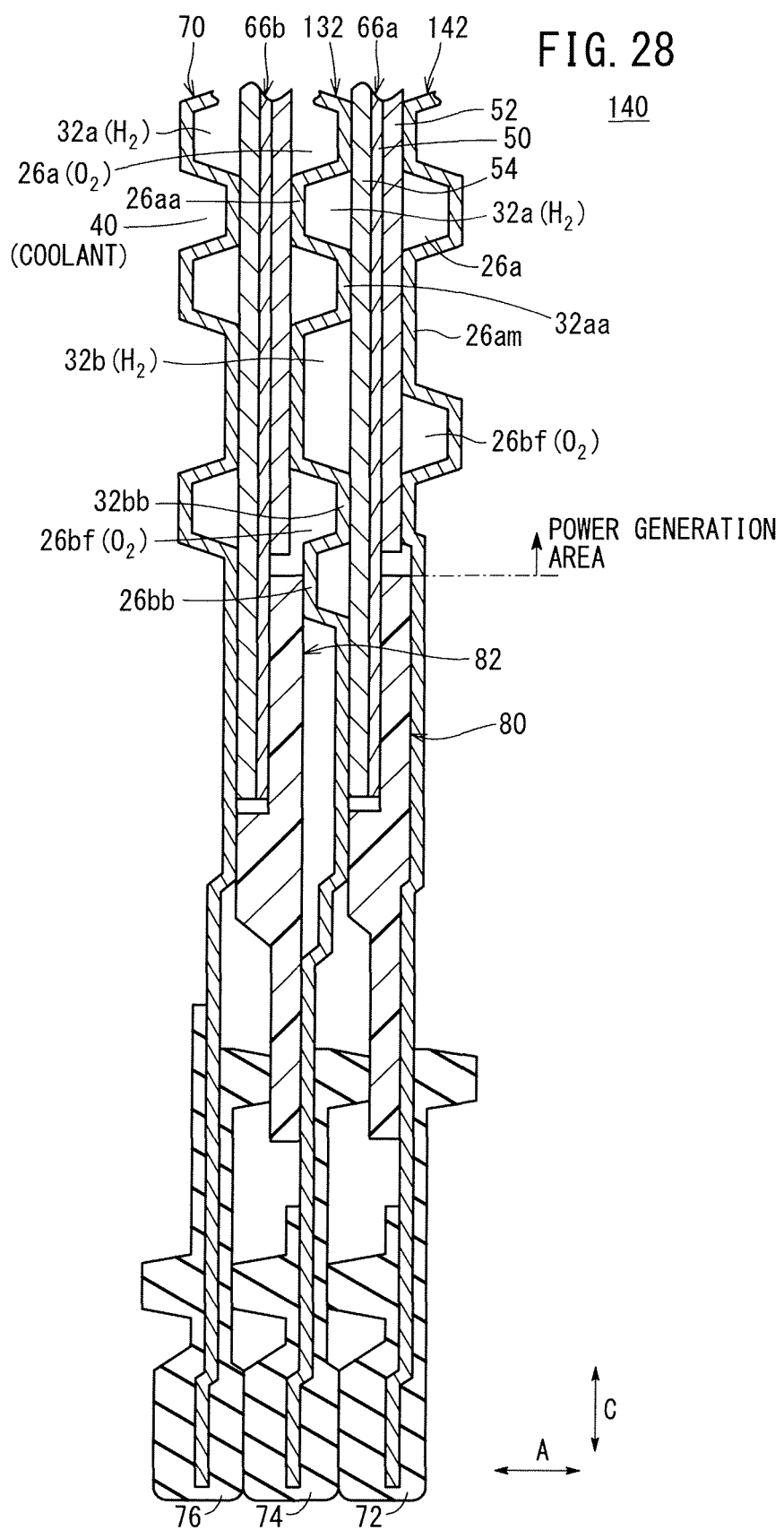
FIG. 28 is a cross sectional view showing the fuel cell, taken along a line XXVIII-XXVIII in FIG. 26.

A plurality of fuel cells 140 according to a sixth embodiment of the present invention shown in FIGS. 26 to 28 are stacked together in a horizontal direction indicated by an arrow A to form a fuel cell stack, e.g., mounted in a vehicle. The constituent elements that are identical to those of the fuel cell 130 according to the fifth embodiment are labeled with the same reference numerals, and detailed descriptions thereof will be omitted.

The fuel cell 140 has a first separator 142, a first membrane electrode assembly 66a, a second separator 132, a second membrane electrode assembly 66b, and a third separator 70. For example, the first separator 142 is a laterally elongated metal plate such as a steel plate, a stainless steel plate, an aluminum plate, a plated steel sheet, or a metal plate having anti-corrosive surfaces by surface treatment. The first separator 142 has a rectangular shape in a plan view, and is formed by corrugating a metal thin plate by press forming to have a corrugated shape in cross section.

Figure 29:
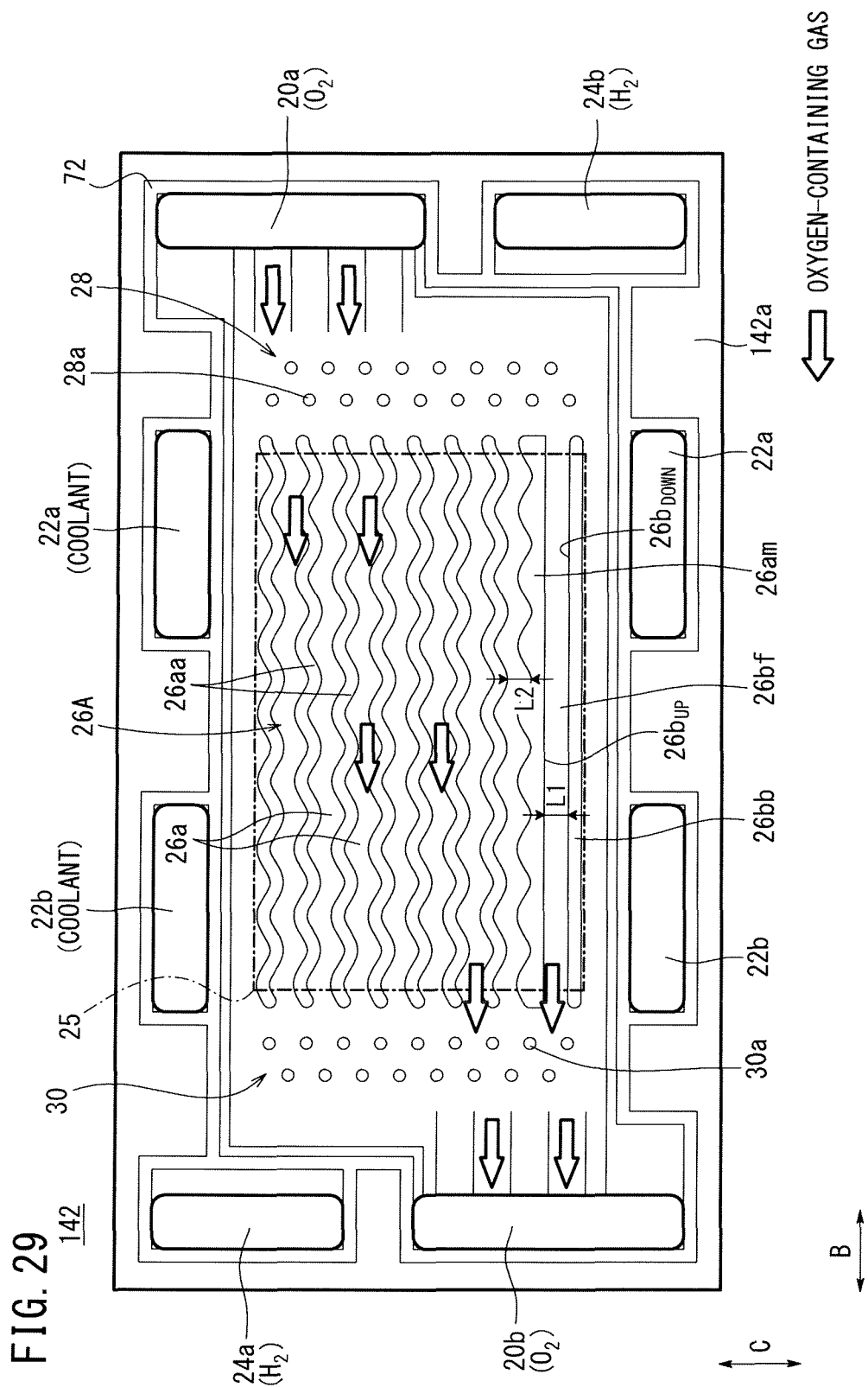
FIG. 29 is a front view showing a first separator of the fuel cell.

As shown in FIG. 29, the first separator 142 has a first oxygen-containing gas flow field 26A on its surface 142a facing the first membrane electrode assembly 66a. The first oxygen-containing gas flow field 26A has a plurality of corrugated flow grooves 26a. A mountain shaped ridge 26am is provided below a corrugated ridge 26aa at the lowermost position, and a flat flow field 26bf is provided below the mountain shaped ridge 26am.

In the sixth embodiment, the same advantages as in the case of the first to fifth embodiments are obtained. For example, though the water produced in the power generation reaction tends to be retained as stagnant water on the lower side of the first oxygen-containing gas flow field 26A in the direction of the gravity, with the simple structure, the water can be discharged from the first oxygen-containing gas flow field 26A easily and reliably. It should be noted that the same structure may be adopted also in third separator 70.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell formed by stacking a membrane electrode assembly and separators in a horizontal direction, the membrane electrode assembly including a pair of electrodes and an electrolyte membrane interposed between the pair of electrodes, the electrodes each having an electrode surface standing vertically in a direction of gravity, a reactant gas flow field being provided for allowing an oxygen-containing gas or a fuel gas as a reactant gas to flow along the electrode surface in the horizontal direction,
  wherein the reactant gas flow field includes:
    a plurality of corrugated flow grooves extending in a wavy pattern in a horizontal direction, and arranged in the direction of the gravity; and
    a flat flow field provided within a power generation area, at a lowermost position in the direction of the gravity, the flat flow field having a bottom extending straight in the horizontal direction; and
  wherein a flow field cross sectional area of the flat flow field is larger than a flow field cross sectional area of the corrugated flow grooves.

2. The fuel cell according to claim 1, wherein the bottom of the flat flow field extends straight in the horizontal direction; and
  the flat flow field has a ceiling oppositely to the bottom, and the ceiling of the flat flow field extends in a wavy pattern in the horizontal direction.

3. The fuel cell according to claim 1, wherein the separator is a metal separator, and the metal separator has the corrugated flow grooves formed by press forming;
  a resin frame member is provided integrally with the membrane electrode assembly around the electrodes; and
  the flat flow field is formed between a straight ridge formed integrally with the resin frame member and the corrugated flow groove.

4. The fuel cell according to claim 1, wherein the bottom of the flat flow field extends straight in the horizontal direction; and
  the flat flow field has a ceiling oppositely to the bottom, and the ceiling of the flat flow field extends straight in the horizontal direction.

5. The fuel cell according to claim 4, wherein a flow field width of the flat flow field is constant in the horizontal direction; and
  a flow field width of the corrugated flow groove at a lowermost position adjacent to the flat flow field is constant in the horizontal direction.

6. The fuel cell according to claim 1, comprising a first separator, a first membrane electrode assembly, a second separator, a second membrane electrode assembly, and a third separator stacked together,
  wherein the second separator has the flat flow field on a first surface facing the first membrane electrode assembly, the bottom of the flat flow field extends straight in the horizontal direction, the flat flow field has a ceiling oppositely to the bottom, the ceiling of the flat flow field extends in a wavy pattern in the horizontal direction, and a flow field width of the corrugated flow groove at a lowermost position adjacent to the flat flow field is constant in the horizontal direction; and,
  the second separator has the flat flow field on a second surface facing the second membrane electrode assembly, the bottom of the flat flow field extends straight in the horizontal direction, the flat flow field has a ceiling oppositely to the bottom, and the ceiling of the flat flow field extends straight in the horizontal direction, and a flow field width of the corrugated flow groove at a lowermost position adjacent to the flat flow field is constant in the horizontal direction.

\* \* \* \* \*